(12) United States Patent
Li

(10) Patent No.: US 11,343,513 B2
(45) Date of Patent: May 24, 2022

(54) IMAGE ENCODING METHOD AND DECODING METHOD, ENCODER, DECODER, AND STORAGE MEDIUM

(71) Applicant: XI'AN ZHONGXING NEW SOFTWARE CO., LTD., Shaanxi (CN)

(72) Inventor: Ming Li, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 17/255,018

(22) PCT Filed: May 8, 2019

(86) PCT No.: PCT/CN2019/086046
§ 371 (c)(1),
(2) Date: Dec. 22, 2020

(87) PCT Pub. No.: WO2020/001170
PCT Pub. Date: Jan. 2, 2020

(65) Prior Publication Data
US 2021/0274193 A1 Sep. 2, 2021

(30) Foreign Application Priority Data
Jun. 26, 2018 (CN) .......................... 201810671512.9

(51) Int. Cl.
*H04N 19/159* (2014.01)
*H04N 19/132* (2014.01)
(Continued)

(52) U.S. Cl.
CPC ......... *H04N 19/159* (2014.11); *H04N 19/132* (2014.11); *H04N 19/137* (2014.11); *H04N 19/174* (2014.11); *H04N 19/176* (2014.11)

(58) Field of Classification Search
CPC .. H04N 19/159; H04N 19/132; H04N 19/137; H04N 19/174; H04N 19/176
See application file for complete search history.

(56) References Cited

U.S. PATENT DOCUMENTS

2006/0239349 A1 10/2006 Shibayama
2009/0141798 A1 6/2009 Adachi et al.
(Continued)

FOREIGN PATENT DOCUMENTS

CN 101483780 A 7/2009
CN 103067699 A 4/2013
(Continued)

OTHER PUBLICATIONS

International Search Report for the International Patent Application No. PCT/CN2019/086046, dated Jul. 8, 2019, 4 pages.
(Continued)

*Primary Examiner* — Hesham K Abouzahra
(74) *Attorney, Agent, or Firm* — KDB Firm PLLC

(57) ABSTRACT

Provided is an image encoding method. The method includes: determining a first reference sample value of an encoding block according to a pixel sample value in the encoding block; determining an intra prediction mode of the encoding block according to the first reference sample value, and calculating an intra prediction value of the encoding block; obtaining a prediction difference parameter according to original values of the encoding block and the intra prediction value; and encoding the first reference sample value, the intra prediction mode, and the prediction difference parameter, and writing encoded bits into a bitstream. Further provided are an image decoding method, an encoder, a decoder, and a computer storage medium.

19 Claims, 8 Drawing Sheets

(51) Int. Cl.
*H04N 19/137* (2014.01)
*H04N 19/174* (2014.01)
*H04N 19/176* (2014.01)

(56) References Cited

U.S. PATENT DOCUMENTS

2016/0198183 A1* 7/2016 Oh .................. H04N 19/11
                                          375/240.12
2016/0241882 A1* 8/2016 Sato ................ H04N 19/82

FOREIGN PATENT DOCUMENTS

| CN | 103168472 A | 6/2013 |
| CN | 103460700 A | 12/2013 |
| CN | 104025588 A | 9/2014 |
| CN | 107105241 A | 8/2017 |
| CN | 108141585 A | 6/2018 |
| EP | 3852364 A1 | 7/2021 |
| JP | 2017130938 A | 7/2017 |
| JP | 2018514119 A | 5/2018 |

OTHER PUBLICATIONS

Bi Jijie., "A New Generation Video Compression Coding Standard—Chapter 3: Basic principles of video compression coding" Download at http://www.pin5i.com/ Nov. 2009, 7 pages.
Author Unknown., "New Standard for Video Coding and its Extensions" retrieved Dec. 1, 2021, 8 pages.
Office Action for the Chinese Patent Application No. 201810671512.9, dated Sep. 28, 2021, 8 pages.
Search Report for the Chinese Patent Application No. 201810671512.9, dated Sep. 28, 2021, 3 pages.
Notice of Reasons for Refusal for JP 2020-572841, dated Mar. 3, 2022 (ten (10)) pages.

* cited by examiner

IMAGE ENCODING METHOD AND DECODING METHOD, ENCODER, DECODER, AND STORAGE MEDIUM

CROSS-REFERENCES TO RELATED APPLICATIONS

This application is a national stage application filed under 35 U.S.C. 371 based on International Patent Application No. PCT/CN2019/086046, filed on May 8, 2019, which claims priority to Chinese Patent Application No. 201810671512.9 filed with the CNIPA on Jun. 26, 2018, disclosures of which are incorporated herein by reference in their entireties.

TECHNICAL FIELD

The present disclosure relates to the field of communications and, in particular, to an image encoding method, an image decoding method, an encoder, a decoder, and a storage medium.

BACKGROUND

A digital video and image compression and encoding technology removes redundancy in a video and an image by using the correlation between sample values of pixel points in the video and the image. The compression and encoding technology includes intra prediction and inter prediction. Specifically, the intra prediction is to predict a to-be-encoded pixel point based on adjacent encoded pixel points by using the correlation in spatial domain between sample values of adjacent pixel points in the image, thereby reducing the redundancy between adjacent pixel points in the spatial domain. The inter prediction adopts not only the correlation between adjacent pixel points in the spatial domain in a single-frame image but also the correlation between adjacent images in time domain. For example, a current to-be-encoded image is predicted with reference to an encoded image by using motion estimation (ME) and motion compensation (MC).

At present, an intra prediction method used in related video and image encoding standards is to construct the prediction value of a pixel point in a current encoding block by using encoded pixel points (i.e., reference pixel points) at a left adjacent position and an above adjacent position of the current encoding block. An intra prediction mode indicates a method for constructing the prediction value of a pixel point in an encoding block by using adjacent pixel points of the encoding block, such as a direct current (DC) mode and an intra prediction direction.

However, a related video and image encoding method has a relatively large intra prediction error and a relatively large encoding bit overhead in a case where none or part of intra prediction reference pixels are available.

SUMMARY

To solve the preceding technical problem, the present disclosure desires to provide an image encoding method, an image decoding method, an encoder, a decoder, and a storage medium, which can reduce an intra prediction error in video and image encoding.

The technical solutions of the present disclosure are implemented as described below.

In a first aspect, an embodiment of the present disclosure provides an image encoding method.

The method includes steps described below.

A first reference sample value of an encoding block is determined according to a pixel sample value in the encoding block.

An intra prediction mode of the encoding block is determined according to the first reference sample value and an intra prediction value of the encoding block is calculated.

A prediction difference parameter is obtained according to original values of the encoding block and the intra prediction value.

The first reference sample value, the intra prediction mode, and the prediction difference parameter are encoded, and encoded bits are written into a bitstream.

Optionally, the step in which the prediction difference parameter is obtained according to the original values of the encoding block and the intra prediction value exemplarily includes steps described below.

Difference values between the original values and the intra prediction value of the encoding block are calculated to obtain prediction difference values of the encoding block.

The prediction difference values are transformed and quantized to obtain the prediction difference parameter.

Optionally, the step in which the first reference sample value of the encoding block is determined according to the pixel sample value in the encoding block includes steps described below.

It is determined whether reference sample values of the encoding block are existent, where the reference sample values are restored pixel sample values of one or more pixel points adjacent to the encoding block.

In a case where part or all of the reference sample values of the encoding block are non-existent, the first reference sample value of the encoding block is determined according to the pixel sample value in the encoding block.

Alternatively, it is determined whether all of reference sample values in a matching block of the encoding block are existent.

In a case where part or all of the reference sample values in the matching block of the encoding block are non-existent, it is determined that part or all of reference sample values of the encoding block are non-existent, and the first reference sample value of the encoding block is determined according to the pixel sample value in the encoding block.

Optionally, the matching block of the encoding block is located at a region which is in an image where the encoding block is located and has a same size as the encoding block.

Optionally, a method for determining whether a reference sample value of the reference sample values is existent includes at least one of methods described below.

In a case where a position of a reference pixel point corresponding to the reference sample value is in an unencoded image region in an image where the encoding block is located, it is determined that the reference sample value is non-existent.

In a case where a position of a reference pixel point corresponding to the reference sample value is outside a boundary of an image where the encoding block is located, it is determined that the reference sample value is non-existent.

In an image where the encoding block is located, in a case where a position of a reference pixel point corresponding to the reference sample value is outside a slice where the encoding block is located, it is determined that the reference sample value is non-existent.

In an image where the encoding block is located, in a case where a position of a reference pixel point corresponding to the reference sample value is outside a tile where the encoding block is located, it is determined that the reference sample value is non-existent.

In response to an intra prediction limited mode, in an image where the encoding block is located, in a case where a position of a reference pixel point corresponding to the reference sample value is in an encoding block of a non-intra prediction mode, it is determined that the reference sample value is non-existent.

Optionally, the step in which the first reference sample value of the encoding block is determined according to the pixel sample value in the encoding block includes a step described below.

The first reference sample value is determined according to the pixel sample value in the encoding block by a soft decision method.

Optionally, the step in which the first reference sample value is determined according to the pixel sample value in the encoding block by the soft decision method exemplarily includes a step described below.

The first reference sample value is calculated by a constrained optimization method, where a constrained optimization calculation formula is:

$$\min D = \Sigma_k d(x_k, p_k) \; s.t. \; R \leq R_C;$$

where D is encoding distortion of the encoding block, k is a traversal range that includes one or more pixels in the encoding block, d(a, b) is an error value between a and b, $x_k$ is a to-be-encoded pixel sample value in the encoding block, $p_k$ is a prediction value of $x_k$ calculated according to the intra prediction mode by using the first reference sample value, R is an encoding bit overhead of the encoding block, and $R_C$ is an upper limit of the encoding bit overhead of the encoding block.

Optionally, the step in which the first reference sample value is determined according to the pixel sample value in the encoding block by the soft decision method exemplarily includes a step described below.

The first reference sample value is calculated by an unconstrained optimization method, where an unconstrained optimization calculation formula is:

$$(r, m)_{opt} = \arg \min(D + \lambda \cdot R);$$

where r is the first reference sample value, m is the intra prediction mode of the encoding block, D is encoding distortion of the encoding block, and R is an encoding bit overhead of the encoding block, and λ is a Lagrange factor.

Optionally, the step in which the first reference sample value of the encoding block is determined according to the pixel sample value in the encoding block exemplarily includes a step described below.

In response to determining that all of the reference sample values of the encoding block are non-existent, the first reference sample value is set to an average value of the original values of the encoding block.

In response to determining that one part of the reference sample values of the encoding block are non-existent, the first reference sample value is set to a difference value between the average value of the original values of the encoding block and an average value of existent reference sample values that are the other part of the reference sample values of the encoding block.

Optionally, the first reference sample value includes at least two sample values and a usage manner indication parameter, where a sample value usage manner parameter is used for indicating a usage manner of the at least two sample values included in the first reference sample value in a process of setting the reference sample values of the encoding block.

Optionally, the first reference sample value includes two sample values, and the step in which the first reference sample value of the encoding block is determined according to the pixel sample value in the encoding block includes a step described below.

A value of a non-existent reference sample value at a position of a left adjacent reference pixel point of the encoding block and a value of a non-existent reference sample value at a position of an above adjacent reference pixel point of the encoding block are set respectively according to the two sample values.

Optionally, the step in which the intra prediction mode of the encoding block is determined according to the first reference sample value and the intra prediction value of the encoding block is calculated includes steps described below.

A non-existent reference sample value of the encoding block is set by using the first reference sample value.

The intra prediction mode of the encoding block is determined according to reference sample values of the encoding block by a rate-distortion optimization method, and the intra prediction value of the encoding block is calculated by using the intra prediction mode.

Optionally, the step in which the intra prediction mode of the encoding block is determined according to the first reference sample value and the intra prediction value of the encoding block is calculated includes steps described below.

A non-existent reference sample value of the encoding block is set by using the first reference sample value.

Reference sample values of the encoding block are filtered to obtain the filtered reference sample values.

The intra prediction mode of the encoding block is determined according to the filtered reference sample values by a rate-distortion optimization method, and the intra prediction value of the encoding block is calculated by using the intra prediction mode.

Optionally, the step in which the reference sample values of the encoding block are filtered to obtain the filtered reference sample values includes steps described below.

A filter control parameter is determined by the rate-distortion optimization method, where the filter control parameter is used for indicating whether to filter the reference sample values.

In a case where the filter control parameter indicates that the reference sample values are to be filtered, the reference sample values of the encoding block are filtered to obtain the filtered reference sample values.

Optionally, the step in which the reference sample values of the encoding block are filtered to obtain the filtered reference sample values includes steps described below.

In a case where a size of the encoding block is equal to a preset value, a filter control parameter is determined by the rate-distortion optimization method, where the filter control parameter is used for indicating whether to filter the reference sample values.

In a case where the filter control parameter indicates that the reference sample values are to be filtered, the reference sample values of the encoding block are filtered to obtain the filtered reference sample values.

Optionally, the step in which the reference sample values of the encoding block are filtered to obtain the filtered reference sample values includes a step described below.

In a case where a size of the encoding block is equal to a preset value, the reference sample values of the encoding block are filtered to obtain the filtered reference sample values.

Optionally, the step in which the reference sample values of the encoding block are filtered to obtain the filtered reference sample values includes steps described below.

In a case where the intra prediction mode of the encoding block is a preset mode, a filter control parameter is determined by the rate-distortion optimization method, where the filter control parameter is used for indicating whether to filter the reference sample values.

In a case where the filter control parameter indicates that the reference sample values are to be filtered, the reference sample values of the encoding block are filtered to obtain the filtered reference sample values.

Optionally, the step in which the reference sample values of the encoding block are filtered to obtain the filtered reference sample values includes a step described below.

In a case where the intra prediction mode of the encoding block is a preset mode, the reference sample values of the encoding block are filtered to obtain the filtered reference sample values.

Optionally, the step in which the reference sample values of the encoding block are filtered to obtain the filtered reference sample values includes steps described below.

In a case where a size of the encoding block is equal to a preset value and the intra prediction mode of the encoding block is a preset mode, a filter control parameter is determined by the rate-distortion optimization method, where the filter control parameter is used for indicating whether to filter the reference sample values.

In a case where the filter control parameter indicates that the reference sample values are to be filtered, the reference sample values of the encoding block are filtered to obtain the filtered reference sample values.

Optionally, the step in which the reference sample values of the encoding block are filtered to obtain the filtered reference sample values includes a step described below.

In a case where a size of the encoding block is equal to a preset value and the intra prediction mode of the encoding block is a preset mode, the reference sample values of the encoding block are filtered to obtain the filtered reference sample values.

Optionally, the reference sample values of the encoding block are filtered to obtain the filtered reference sample values, the method further includes a step described below.

The filter control parameter for the encoding block is encoded, and an encoded bit of the filter control parameter is written into the bitstream.

Optionally, the step in which the first reference sample value is encoded includes steps described below.

The first reference sample value is encoded to obtain an encoded bit of the first reference sample value.

The encoded bit of the first reference sample value is written into a data unit in the bitstream, where the data unit in the bitstream includes at least one of: one or more parameter sets, a slice header, or a block layer data unit.

Optionally, the step in which the first reference sample value is encoded includes steps described below.

The first reference sample value includes one or more sample values.

The one or more sample values in the first reference sample value are encoded to obtain encoded bits of the one or more sample values in the first reference sample, and the encoded bits are written into a data unit in the bitstream.

Optionally, the step in which the one or more sample values in the first reference sample value are encoded to obtain the encoded bits of the one or more sample values in the first reference sample further includes steps described below.

A sample value usage manner parameter is encoded, and an encoded bit of the sample value usage manner parameter is written into the data unit in the bitstream.

Optionally, the first reference sample value includes a sample value control parameter, where the sample value control parameter includes at least one of the following control parameters: a sequence layer sample value control parameter, an image layer sample value control parameter, a slice layer sample value control parameter, or a block layer sample value control parameter.

In a second aspect, an embodiment of the present disclosure provides an image decoding method.

The method includes steps described below.

A bitstream is parsed to obtain a first reference sample value, an intra prediction mode, and a prediction difference parameter of a decoding block.

An intra prediction reference sample value of the decoding block are determined according to the first reference sample value.

An intra prediction value of the decoding block is constructed according to the intra prediction reference sample value and the intra prediction mode.

A prediction difference of the decoding block is calculated by using the prediction difference parameter.

A sum of the intra prediction value and the prediction difference is calculated to obtain a restored value of the decoding block.

Optionally, the step in which the intra prediction reference sample value of the decoding block are determined according to the first reference sample value includes steps described below.

It is determined whether reference sample values of the decoding block are existent, where the reference sample values are restored pixel sample values of one or more pixel points adjacent to the decoding block.

In a case where part or all of the reference sample values of the decoding block are non-existent, a non-existent reference sample value of the decoding block is determined according to the first reference sample value to obtain the intra prediction reference sample value.

Alternatively, it is determined whether all of reference sample values in a matching block of the decoding block are existent.

In a case where part or all of the reference sample values in the matching block of the decoding block are non-existent, it is determined that part or all of reference sample values of the decoding block are non-existent, and a non-existent reference sample value of the decoding block is determined according to the first reference sample value to obtain the intra prediction reference sample value.

Optionally, the matching block of the decoding block is located at a region which is in an image where the decoding block is located and has a same size as the decoding block.

Optionally, a method for determining whether a reference sample value of the reference sample values is existent includes at least one of methods described below.

In a case where a position of a reference pixel point corresponding to the reference sample value is in an undecoded image region in an image where the decoding block is located, it is determined that the reference sample value is non-existent.

In a case where a position of a reference pixel point corresponding to the reference sample value is outside a boundary of an image where the decoding block is located, it is determined that the reference sample value is non-existent.

In an image where the decoding block is located, in a case where a position of a reference pixel point corresponding to the reference sample value is outside a slice where the decoding block is located, it is determined that the reference sample value is non-existent.

In an image where the decoding block is located, in a case where a position of a reference pixel point corresponding to the reference sample value is outside a tile where the decoding block is located, it is determined that the reference sample value is non-existent.

In response to an intra prediction limited mode, in an image where the decoding block is located, in a case where a position of a reference pixel point corresponding to the reference sample value is in a decoding block of a non-intra prediction mode, it is determined that the reference sample value is non-existent.

Optionally, the step in which the bitstream is parsed to obtain the first reference sample value of the decoding block includes a step described below.

One or more data units in the bitstream are parsed to obtain the first reference sample value, where each of the one or more data units includes at least one of one or more parameter sets, a slice header, or a block layer data unit.

Optionally, the step in which the bitstream is parsed to obtain the first reference sample value of the decoding block includes a step described below.

One or more data units in the bitstream are parsed to obtain a sample value usage manner parameter, where the sample value usage manner parameter is used for indicating a usage manner of a sample value included in the first reference sample value in a process of setting reference sample values of the decoding block.

Optionally, the first reference sample value includes a sample value control parameter, where the sample value control parameter includes at least one of: a sequence layer sample value control parameter, an image layer sample value control parameter, a slice layer sample value control parameter, or a block layer sample value control parameter.

Optionally, the step in which the non-existent reference sample value of the decoding block is determined according to the first reference sample value includes a step described below.

The non-existent reference sample value of the decoding block is set by using the first reference sample value.

Optionally, the first reference sample value includes a sample value control parameter, and the step in which the non-existent reference sample value of the decoding block is determined according to the first reference sample value includes a step described below.

In a case where the sample value control parameter indicates that the non-existent reference sample value is to be constructed by using the first reference sample value, the non-existent reference sample value of the decoding block is set by using the first reference sample value.

Optionally, the first reference sample value includes a sample value usage manner parameter, and the step in which the non-existent reference sample value of the decoding block is determined according to the first reference sample value includes a step described below.

In a case where the first reference sample value includes at least two sample values, the non-existent reference sample value of the decoding block is set by using the at least two sample values included in the first reference sample value according to the sample value usage manner parameter.

Optionally, the first reference sample value includes two sample values, and the step in which the non-existent reference sample value of the decoding block is set by using the at least two sample values included in the first reference sample value according to the sample value usage manner parameter includes a step described below.

A non-existent reference sample value at a position of a left adjacent reference pixel point of the decoding block and a non-existent reference sample value at a position of an above adjacent reference pixel point of the decoding block are set respectively by using the two sample values in the first reference sample value according to a preset rule.

Optionally, the step in which the intra prediction value of the decoding block is constructed according to the intra prediction reference sample value and the intra prediction mode, the method further includes steps described below.

The intra prediction reference sample value is filtered to obtain the filtered reference sample value.

The intra prediction value of the decoding block is calculated by using the filtered reference sample values and according to the intra prediction mode.

Optionally, the step in which the intra prediction reference sample value is filtered to obtain the filtered reference sample value includes steps described below.

The bitstream is parsed to obtain a filter control parameter, where the filter control parameter is used for indicating whether to filter the intra prediction reference sample value.

In a case where the filter control parameter indicates that the intra prediction reference sample value is to be filtered, the intra prediction reference sample value is filtered to obtain the filtered reference sample value.

Optionally, the step in which the intra prediction reference sample value is filtered to obtain the filtered reference sample value includes steps described below.

In a case where a size of the decoding block is equal to a preset value, the bitstream is parsed to obtain a filter control parameter.

In a case where the filter control parameter indicates that the intra prediction reference sample value is to be filtered, the intra prediction reference sample value is filtered to obtain the filtered reference sample value.

Optionally, the step in which the intra prediction reference sample value is filtered to obtain the filtered reference sample value includes a step described below.

In a case where a size of the decoding block is equal to a preset value, the intra prediction reference sample value is filtered to obtain the filtered reference sample value.

Optionally, the step in which the intra prediction reference sample value is filtered to obtain the filtered reference sample value includes steps described below.

In a case where the intra prediction mode of the decoding block is a preset mode, the bitstream is parsed to obtain a filter control parameter.

In a case where the filter control parameter indicates that the intra prediction reference sample value is to be filtered, the intra prediction reference sample value is filtered to obtain the filtered reference sample value.

Optionally, the step in which the intra prediction reference sample value is filtered to obtain the filtered reference sample value includes a step described below.

In a case where the intra prediction mode of the decoding block is a preset mode, the intra prediction reference sample value is filtered to obtain the filtered reference sample value.

Optionally, the step in which the intra prediction reference sample value is filtered to obtain the filtered reference sample value includes steps described below.

In a case where a size of the decoding block is equal to a preset value and the intra prediction mode of the decoding block is a preset mode, the bitstream is parsed to obtain a filter control parameter.

In a case where the filter control parameter indicates that the intra prediction reference sample value is to be filtered, the intra prediction reference sample value is filtered to obtain the filtered reference sample value.

Optionally, the step in which the intra prediction reference sample value is filtered to obtain the filtered reference sample value includes a step described below.

In a case where a size of the decoding block is equal to a preset value and the intra prediction mode of the decoding block is a preset mode, the intra prediction reference sample value is filtered to obtain the filtered reference sample value.

Optionally, the step in which the prediction difference of the decoding block is calculated by using the prediction difference parameter includes a step described below.

The prediction difference parameter is scaled and transformed to obtain the prediction difference of the decoding block.

Optionally, after the sum of the intra prediction value and the prediction difference is set to the restored value of the decoding block, the method further includes a step described below.

Loop filtering is performed on the restored value of the decoding block to obtain a decoded value.

In a third aspect, an embodiment of the present disclosure provides an image encoding apparatus including a first reference sample value determining unit, an intra prediction value determining unit, a prediction difference parameter obtaining unit, and an encoding unit.

The first reference sample value determining unit is configured to determine a first reference sample value of an encoding block according to a pixel sample value in the encoding block.

The intra prediction value determining unit is configured to determine an intra prediction mode of the encoding block according to the first reference sample value determined by the first reference sample value determining unit and calculate an intra prediction value of the encoding block.

The prediction difference parameter obtaining unit is configured to obtain a prediction difference parameter according to original values of the encoding block and the intra prediction value calculated by the intra prediction value determining unit.

The encoding unit is configured to encode the first reference sample value determined by the first reference sample value determining unit, the intra prediction mode determined by the intra prediction value determining unit, and the prediction difference parameter obtained by the prediction difference parameter obtaining unit and write encoded bits into a bitstream.

Optionally, the prediction difference parameter obtaining unit is exemplarily configured to perform operations described below.

Difference values between the original values and the intra prediction value of the encoding block are calculated to obtain prediction difference values of the encoding block.

The prediction difference values are transformed and quantized to obtain the prediction difference parameter.

Optionally, the first reference sample value determining unit is exemplarily configured to perform operations described below.

It is determined whether reference sample values of the encoding block are existent, where the reference sample values are restored pixel sample values of one or more pixel points adjacent to the encoding block.

In a case where part or all of the reference sample values of the encoding block are non-existent, the first reference sample value of the encoding block is determined according to the pixel sample value in the encoding block.

Alternatively, it is determined whether all of reference sample values in a matching block of the encoding block are existent.

In a case where part or all of the reference sample values in the matching block of the encoding block are non-existent, it is determined that part or all of reference sample values of the encoding block are non-existent, and the first reference sample value of the encoding block is determined according to the pixel sample value in the encoding block.

Optionally, the first reference sample value determining unit is exemplarily configured to perform an operation described below.

The first reference sample value is determined according to the pixel sample value in the encoding block by a soft decision method.

Optionally, the first reference sample value determining unit is exemplarily configured to perform operations described below.

In response to determining that all of the reference sample values of the encoding block are non-existent, the first reference sample value is set to an average value of the original values of the encoding block.

In response to determining that one part of the reference sample values of the encoding block are non-existent, the first reference sample value is set to a difference value between the average value of the original values of the encoding block and an average value of existent reference sample values that are the other part of the reference sample values of the encoding block.

Optionally, the intra prediction value determining unit is exemplarily configured to perform operations described below.

A non-existent reference sample value of the encoding block is set by using the first reference sample value.

The intra prediction mode of the encoding block is determined according to reference sample values of the encoding block by a rate-distortion optimization method, and the intra prediction value of the encoding block is calculated by using the intra prediction mode.

Optionally, the intra prediction value determining unit is exemplarily configured to perform operations described below.

A non-existent reference sample value of the encoding block is set by using the first reference sample value.

Reference sample values of the encoding block are filtered to obtain the filtered reference sample values.

The intra prediction mode of the encoding block is determined according to the filtered reference sample values by a rate-distortion optimization method, and the intra prediction value of the encoding block is calculated by using the intra prediction mode.

Optionally, the encoding unit is exemplarily configured to perform operations described below.

The first reference sample value is encoded to obtain an encoded bit of the first reference sample value.

The encoded bit of the first reference sample value is written into a data unit in the bitstream, where the data unit in the bitstream includes at least one of one or more parameter sets, a slice header, or a block layer data unit.

In a fourth aspect, an embodiment of the present disclosure provides an image decoding apparatus including a parsing unit, an intra prediction reference sample value determining unit, an intra prediction value determining unit, a prediction difference determining unit, and a restored value obtaining unit.

The parsing unit is configured to parse a bitstream to obtain a first reference sample value, an intra prediction mode, and a prediction difference parameter of a decoding block.

The intra prediction reference sample value determining unit is configured to determine intra prediction reference sample value of the decoding block according to the first reference sample value parsed by the parsing unit.

The intra prediction value determining unit is configured to construct an intra prediction value of the decoding block according to the intra prediction reference sample value determined by the intra prediction reference sample value determining unit and the intra prediction mode parsed by the parsing unit.

The prediction difference determining unit is configured to calculate a prediction difference of the decoding block by using the prediction difference parameter parsed by the parsing unit.

The restored value obtaining unit is configured to calculate a sum of the intra prediction value constructed by the intra prediction value determining unit and the prediction difference calculated by the prediction difference determining unit to obtain a restored value of the decoding block.

Optionally, the parsing unit is exemplarily configured to perform an operation described below.

One or more data units in the bitstream are parsed to obtain the first reference sample value, where each of the one or more data units includes at least one of one or more parameter sets, a slice header, or a block layer data unit.

Optionally, the intra prediction value determining unit is exemplarily configured to perform operations described below.

The intra prediction reference sample value is filtered to obtain the filtered reference sample value.

The intra prediction value of the decoding block is calculated by using the filtered reference sample values and according to the intra prediction mode.

Optionally, the intra prediction reference sample value determining unit is exemplarily configured to perform operations described below.

It is determined whether reference sample values of the decoding block are existent, where the reference sample values are restored pixel sample values of one or more pixel points adjacent to the decoding block.

In a case where part or all of the reference sample values of the decoding block are non-existent, a non-existent reference sample value of the decoding block is determined according to the first reference sample value to obtain the intra prediction reference sample value.

Alternatively, it is determined whether all of reference sample values in a matching block of the decoding block are existent.

In a case where part or all of the reference sample values in the matching block of the decoding block are non-existent, it is determined that part or all of reference sample values of the decoding block are non-existent, and a non-existent reference sample value of the decoding block is determined according to the first reference sample value to obtain the intra prediction reference sample value.

Optionally, the prediction difference determining unit is exemplarily configured to perform an operation described below.

The prediction difference parameter is scaled and transformed to obtain the prediction difference of the decoding block.

Optionally, the restored value obtaining unit is exemplarily configured to perform an operation described below.

Loop filtering is performed on the restored value of the decoding block to obtain a decoded value.

In a fifth aspect, an embodiment of the present disclosure provides an encoder including a first processor, a first storage medium, and a first communication bus, where the first processor is connected to the first storage medium through the first communication bus.

The first processor invokes an image encoding-related program stored in the first storage medium and performs steps described below.

A first reference sample value of an encoding block is determined according to a pixel sample value in the encoding block.

An intra prediction mode of the encoding block is determined according to the first reference sample value and an intra prediction value of the encoding block is calculated.

A prediction difference parameter is obtained according to original values of the encoding block and the intra prediction value.

The first reference sample value, the intra prediction mode, and the prediction difference parameter are encoded, and encoded bits are written into a bitstream.

In a sixth aspect, an embodiment of the present disclosure provides a decoder including a second processor, a second storage medium, and a second communication bus, where the second processor is connected to the second storage medium through the second communication bus.

The second processor invokes an image decoding-related program stored in the second storage medium and performs steps described below.

A bitstream is parsed to obtain a first reference sample value, an intra prediction mode, and a prediction difference parameter of a decoding block.

An intra prediction reference sample value of the decoding block are determined according to the first reference sample value.

An intra prediction value of the decoding block is constructed according to the intra prediction reference sample value and the intra prediction mode.

A prediction difference of the decoding block is calculated by using the prediction difference parameter.

A sum of the intra prediction value and the prediction difference is calculated to obtain a restored value of the decoding block is obtained.

In a seventh aspect, an embodiment of the present disclosure provides a computer storage medium applied to an encoder. The computer-readable storage medium stores one or more image encoding-related programs, where the one or more image encoding-related programs are executable by one or more first processors to implement the image encoding method described above.

In an eighth aspect, an embodiment of the present disclosure provides a computer storage medium applied to a decoder. The computer-readable storage medium stores one or more image decoding-related programs, where the one or more image decoding-related programs are executable by one or more second processors to implement the image decoding method described above.

To conclude, the embodiments of the present disclosure provide an image encoding method, an image decoding method, an encoder, a decoder, and a storage medium. The image encoding method includes: determining the first reference sample value of the encoding block according to the pixel sample value in the encoding block; determining the intra prediction mode of the encoding block according to the first reference sample value, and calculating the intra prediction value of the encoding block; obtaining the prediction difference parameter according to the original values of the encoding block and the intra prediction value; and encoding the first reference sample value, the intra prediction mode and the prediction difference parameter, and writing the encoded bits into the bitstream. With the preceding technical solutions, the first reference sample value is calculated and determined according to the to-be-encoded pixel sample value in the encoding block and a first sample value is further used for constructing intra prediction reference sample value of the encoding block. Therefore, in the case where part or all of sample values in adjacent blocks of the encoding block are unavailable, the prediction difference value between the prediction value of intra prediction and the encoding block is effectively reduced, and the encoding efficiency of the intra prediction mode is improved.

DETAILED DESCRIPTION

Figure 1:
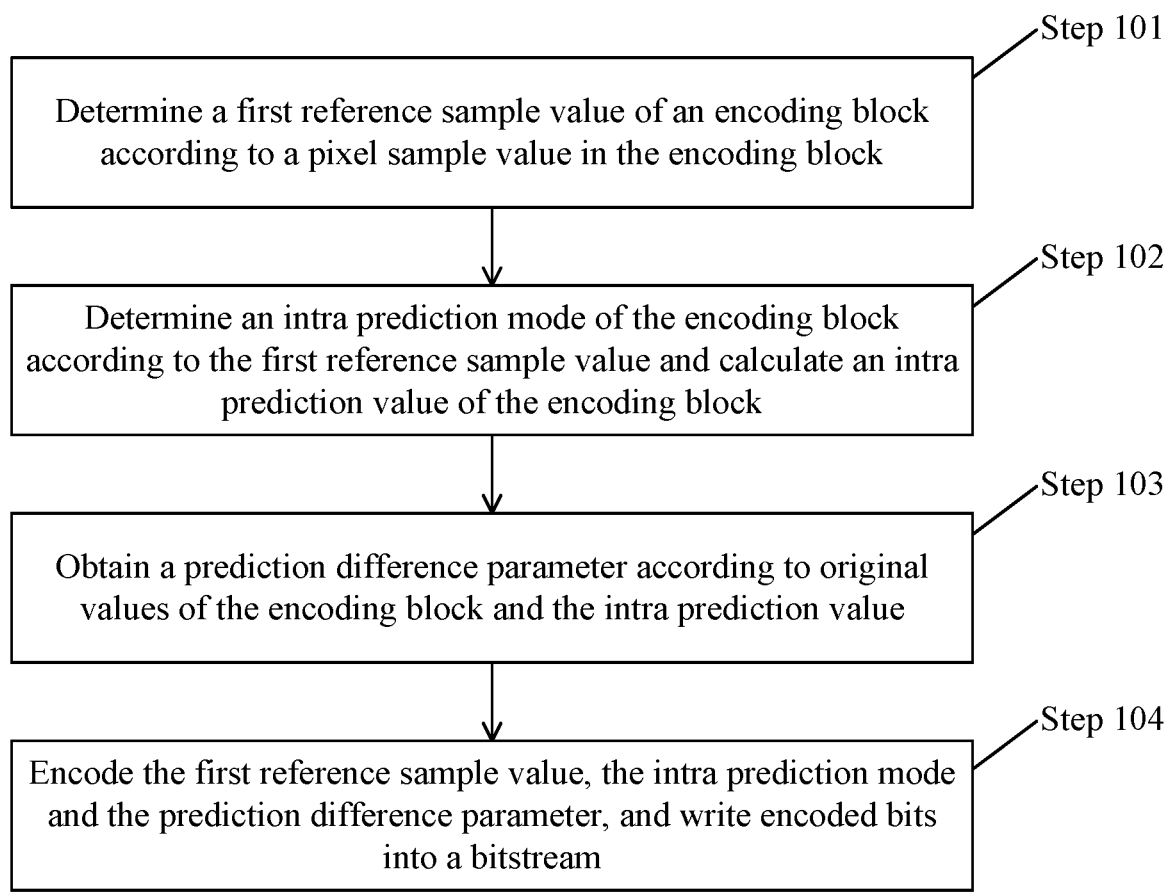
FIG. 1 is a flowchart of an image encoding method according to an embodiment of the present disclosure.

In the related art, an intra prediction method used in video and image encoding standards is to construct the prediction value of a pixel point in a current encoding block by using encoded pixel points at a left adjacent position and an above adjacent position of the current encoding block. An intra prediction mode indicates a method for constructing the prediction value of a pixel point in an encoding block by using adjacent pixel points of the encoding block, such as a direct current (DC) mode and an intra prediction direction. A variety of intra prediction modes are designed in related standards. For example, the H.264/AVC standard adopts nine intra prediction modes which include the DC mode and eight prediction modes with different intra prediction directions; and the H.265/HEVC standard adopts a plane mode, the DC mode, and 33 prediction modes with different intra prediction directions.

In the related intra prediction method, whether reference pixel point are "available" needs to be determined. When the reference pixel points do not exist (for example, the current encoding block is located at the boundary of an image) or cannot be used by the current encoding block (for example, the current block is located at the boundary of a slice), the reference pixel points are considered to be "non-existent". When the reference pixel points are "non-existent", in the H.264/AVC standard, these reference pixel points are marked as "unavailable", and an intra prediction mode using these reference pixel points is also unusable. In the H.265/HEVC standard, the "non-existent" reference pixel points are filled according to a specified rule, and the filled reference pixel points are marked as "available".

In the H.264/AVC standard, the DC mode is a constantly usable intra prediction mode. When all the reference pixel points for the encoding block are "unavailable", an intra prediction value for the DC mode is set to 1<<(BitDepth−1). "<<" is a bitwise operator of an arithmetic left shift defined in the standard, and BitDepth denotes a bit depth of a component. The bit depth refers to the number of bits used through a digital representation of a physical quantity. In this standard, for example, BitDepth of a luminance component is expressed as $BitDepth_Y$, where $BitDepth_Y$ denotes the bit depth of the luminance component. At present, the commonly used bit depth of consumer electronic products is 8 bits. In this case, when all reference pixels are "unavailable", the prediction value for the DC mode is 128. When part of the reference pixels are "available", the DC mode uses the average of sample values of "available" reference pixels as the intra prediction value. In this standard, for un-encoded pixels, the case where reference pixels are "unavailable" mainly includes: pixel points outside the boundary of the image, pixel points outside the boundary of the slice, and that adjacent macroblocks use inter frame coding when a value of constrained_intra_pred_flag is 1.

In the H.265/HEVC standard, when a "non-existent" reference pixel point is at the positions of reference pixel points of the encoding block, "existent" reference pixel points are used for filling the "non-existent" reference pixel point; when all the reference pixel points for the encoding block do not exist, the values of all the used reference pixel points are filled with 1<<(BitDepth−1). In a method for filling an intra prediction reference pixel in this standard, a left adjacent reference pixel point may be used for filling an above adjacent pixel point that is "non-existent". In this standard, the case where reference pixels are "non-existent" mainly includes un-encoded pixels, pixel points outside the boundary of the image, pixel points outside the boundary of the slice, pixel points outside the boundary of a tile, and that adjacent blocks use inter frame coding when the value of constrained_intra_pred_flag is 1.

However, the related video and image encoding standards have defects described below.

(1) In the case where none of intra prediction reference pixels are available, the related method is equivalent to setting the intra prediction value to "1<<(BitDepth−1)". A large deviation between a pixel sample value in the encoding block and "1<<(BitDepth−1)" will cause a relatively large prediction difference of the intra prediction and a large encoding bit overhead.

(2) When part of intra reference pixels are available, a method for restricted usable intra prediction modes, a method of only using the sample values of available reference pixels for calculating the prediction value (such as a DC prediction value), and a filling method using the sample values of available reference pixels have a relatively large intra prediction error since the execution processes of all these methods are based on the sample values of reference pixels and do not involve the pixel sample value in the encoding block.

Technical solutions in embodiments of the present disclosure will be described below clearly and completely in conjunction with the drawings in the embodiments of the present disclosure.

In the following embodiments, a video refers to an image sequence composed of images. A bitstream refers to a bitstream generated by a video encoder encoding the video and also refers to a transmission stream and/or a media file that include the bitstream generated by the video encoder encoding the video and are obtained by performing system layer processing on the bitstream generated by the video encoder encoding the video. The bitstream is decoded so that the video can be obtained. The system layer processing is an encapsulation operation on the bitstream of the video, for example, the bitstream of the video is encapsulated as a data payload into the transmission stream or the bitstream of the video is encapsulated as a payload into the media file. The system layer processing further includes encapsulating the transmission stream or the media file including the bitstream of the video as a data payload into a stream for transmission or a file for storage. A data unit generated through the system layer processing is also referred to as a system layer data unit, and information (such as header information of the system layer data unit) added to the system layer data unit in the process of encapsulating the data payload through the system layer processing is referred to as system layer information. A sub-bitstream refers to a partial bitstream extracted from the bitstream. The sub-bitstream is decoded so that a video image can be obtained, where the video image may be an image with a lower resolution than a video image obtained by decoding the bitstream or an image with a lower frame rate than a video obtained by decoding the bitstream, and the video image may include partial content of the video image obtained by decoding the bitstream.

Embodiment One

Referring to FIG. 1, an embodiment of the present disclosure provides an image encoding method. The method includes steps described below.

In step 101, a first reference sample value of an encoding block is determined according to a pixel sample value in the encoding block.

Optionally, step 101 exemplarily includes: determining whether reference sample values of the encoding block are existent, where the reference sample values are restored pixel sample values of one or more pixel points adjacent to the encoding block; and in a case where part or all of the reference sample values of the encoding block are non-existent, determining the first reference sample value of the encoding block according to the pixel sample value in the encoding block.

Alternatively, it is determined whether all of reference sample values in a matching block of the encoding block are existent; and in a case where part or all of the reference sample values in the matching block of the encoding block are non-existent, it is determined that part or all of reference sample values of the encoding block are non-existent, and the first reference sample value of the encoding block is determined according to the pixel sample value in the encoding block.

The matching block of the encoding block is located at a region which is in an image where the encoding block is located and has a same size as the encoding block.

Exemplarily, a method for determining whether a reference sample value of the reference sample values is existent includes at least one of methods described below.

In a case where a position of a reference pixel point corresponding to the reference sample value is in an un-encoded image region in the image where the encoding block is located, it is determined that the reference sample value is non-existent.

In a case where a position of a reference pixel point corresponding to the reference sample value is outside a boundary of the image where the encoding block is located, it is determined that the reference sample value is non-existent.

In the image where the encoding block is located, in a case where a position of a reference pixel point corresponding to the reference sample value is outside a slice where the encoding block is located, it is determined that the reference sample value is non-existent.

In the image where the encoding block is located, in a case where a position of a reference pixel point corresponding to the reference sample value is outside a tile where the encoding block is located, it is determined that the reference sample value is non-existent.

In response to an intra prediction limited mode, in the image where the encoding block is located, in a case where a position of a reference pixel point corresponding to the reference sample value is in an encoding block of a non-intra prediction mode, it is determined that the reference sample value is non-existent.

Optionally, the first reference sample value is determined according to the pixel sample value in the encoding block by a soft decision method.

Exemplarily, the step in which the first reference sample value of the encoding block is determined according to the pixel sample value in the encoding block by the soft decision method exemplarily includes calculating the first reference sample value by a constrained optimization method, where a constrained optimization calculation formula is:

$$\min D = \Sigma_k d(x_k, p_k) \text{ s.t. } R \leq R_C \quad (1)$$

where D is encoding distortion of the encoding block, k is a traversal range that includes one or more pixels in the encoding block, d(a, b) is an error value between a and b, $x_k$ is a to-be-encoded pixel sample value in the encoding block, $p_k$ is a prediction value of $x_k$ calculated according to the intra prediction mode by using the first reference sample value, R is an encoding bit overhead of the encoding block, and $R_C$ is an upper limit of the encoding bit overhead of the encoding block.

Exemplarily, the step in which the first reference sample value of the encoding block is determined according to the pixel sample value in the encoding block by the soft decision method exemplarily includes calculating the first reference sample value by an unconstrained optimization method, where an unconstrained optimization calculation formula is:

$$(r,m)_{opt} = \arg \min(D + \lambda \cdot R) \qquad (2)$$

where r is the first reference sample value, m is an intra prediction mode of the encoding block, D is the encoding distortion of the encoding block, and R is the encoding bit overhead of the encoding block, and λ is a Lagrange factor.

Optionally, step 101 exemplarily includes: in response to determining that all of the reference sample values of the encoding block are non-existent, setting the first reference sample value to an average value of original values of the encoding block; and in response to determining that one part of the reference sample values of the encoding block are non-existent, setting the first reference sample value to a difference value between the average value of the original values of the encoding block and an average value of existent reference sample values that are the other part of the reference sample values of the encoding block.

Exemplarily, the first reference sample value includes at least two sample values and a usage manner indication parameter, where a sample value usage manner parameter is used for indicating a usage manner of the at least two sample values included in the first reference sample value in a process of setting the reference sample values of the encoding block.

Exemplarily, the first reference sample value includes two sample values, and the step in which the first reference sample value of the encoding block is determined according to the pixel sample value in the encoding block includes: setting a value of a non-existent reference sample value at a position of a left adjacent reference pixel point of the encoding block and a value of a non-existent reference sample value at a position of an above adjacent reference pixel point of the encoding block respectively according to the two sample values.

In step 102, the intra prediction mode of the encoding block is determined according to the first reference sample value, and an intra prediction value of the encoding block is calculated.

Optionally, step 102 includes: setting a non-existent reference sample value of the encoding block by using the first reference sample value; and determining, according to the reference sample values of the encoding block, the intra prediction mode of the encoding block by a rate-distortion optimization method, and calculating the intra prediction value of the encoding block by using the intra prediction mode.

Optionally, step 102 further includes: setting the non-existent reference sample value of the encoding block by using the first reference sample value; filtering the reference sample values of the encoding block to obtain the filtered reference sample values; and determining, according to the filtered reference sample values, the intra prediction mode of the encoding block by the rate-distortion optimization method, and calculating the intra prediction value of the encoding block by using the intra prediction mode.

The step in which the reference sample values of the encoding block are filtered to obtain the filtered reference sample values is performed by methods described below.

In method one, a filter control parameter is determined by the rate-distortion optimization method, where the filter control parameter is used for indicating whether to filter the reference sample values; and in a case where the filter control parameter indicates that the reference sample values are to be filtered, the reference sample values of the encoding block are filtered to obtain the filtered reference sample values.

In method two, in a case where a size of the encoding block is equal to a preset value, the filter control parameter is determined by the rate-distortion optimization method, where the filter control parameter is used for indicating whether to filter the reference sample values; and in the case where the filter control parameter indicates that the reference sample values are to be filtered, the reference sample values of the encoding block are filtered to obtain the filtered reference sample values.

The preset value includes one preset value or one of multiple preset values.

In method three, in the case where the size of the encoding block is equal to the preset value, the reference sample values of the encoding block are filtered to obtain the filtered reference sample values.

In method four, in a case where the intra prediction mode of the encoding block is a preset mode, the filter control parameter is determined by the rate-distortion optimization method, where the filter control parameter is used for indicating whether to filter the reference sample values; and in the case where the filter control parameter indicates that the reference sample values are to be filtered, the reference sample values of the encoding block are filtered to obtain the filtered reference sample values.

The preset mode includes one preset mode or one of multiple preset modes.

In method five, in the case where the intra prediction mode of the encoding block is the preset mode, the reference sample values of the encoding block are filtered to obtain the filtered reference sample values.

In method six, in a case where the size of the encoding block is equal to the preset value and the intra prediction mode of the encoding block is the preset mode, the filter control parameter is determined by the rate-distortion optimization method, where the filter control parameter is used for indicating whether to filter the reference sample values; and in the case where the filter control parameter indicates that the reference sample values are to be filtered, the reference sample values of the encoding block are filtered to obtain the filtered reference sample values.

In method seven, in the case where the size of the encoding block is equal to the preset value and the intra prediction mode of the encoding block is the preset mode, the reference sample values of the encoding block are filtered to obtain the filtered reference sample values.

In an embodiment, the reference sample values of the encoding block are filtered to obtain the filtered reference sample values, the method further includes: encoding the filter control parameter for the encoding block, and writing an encoded bit of the filter control parameter into a bitstream.

In step 103, a prediction difference parameter is obtained according to the original values of the encoding block and the intra prediction value.

Exemplarily, difference values between the original values and the intra prediction value of the encoding block are calculated to obtain prediction difference values of the encoding block; and the prediction difference values are transformed and quantized to obtain the prediction difference parameter.

In step 104, the first reference sample value, the intra prediction mode, and the prediction difference parameter are encoded, and encoded bits are written into the bitstream.

Optionally, the step of encoding the first reference sample value in step 104 includes encoding the first reference sample value to obtain an encoded bit of the first reference sample value; and writing the encoded bit of the first reference sample value into a data unit in the bitstream, where the data unit in the bitstream includes at least one of: one or more parameter sets, a slice header, or a block layer data unit.

Optionally, the step of encoding the first reference sample value in step 104 includes: in a case where the first reference sample value includes one or more sample values, encoding the one or more sample values in the first reference sample value to obtain encoded bits of the one or more sample values in the first reference sample, and writing the encoded bits into the data unit in the bitstream.

In an embodiment, the step in which the one or more sample values in the first reference sample value are encoded to obtain the encoded bits of the one or more sample values in the first reference sample further includes: encoding the sample value usage manner parameter, and writing an encoded bit of the sample value usage manner parameter into the data unit in the bitstream.

In the embodiment of the present disclosure, the first reference sample value includes a sample value control parameter, where the sample value control parameter includes at least one of: a sequence layer sample value control parameter, an image layer sample value control parameter, a slice layer sample value control parameter, or a block layer sample value control parameter.

Embodiment Two

Figure 2:
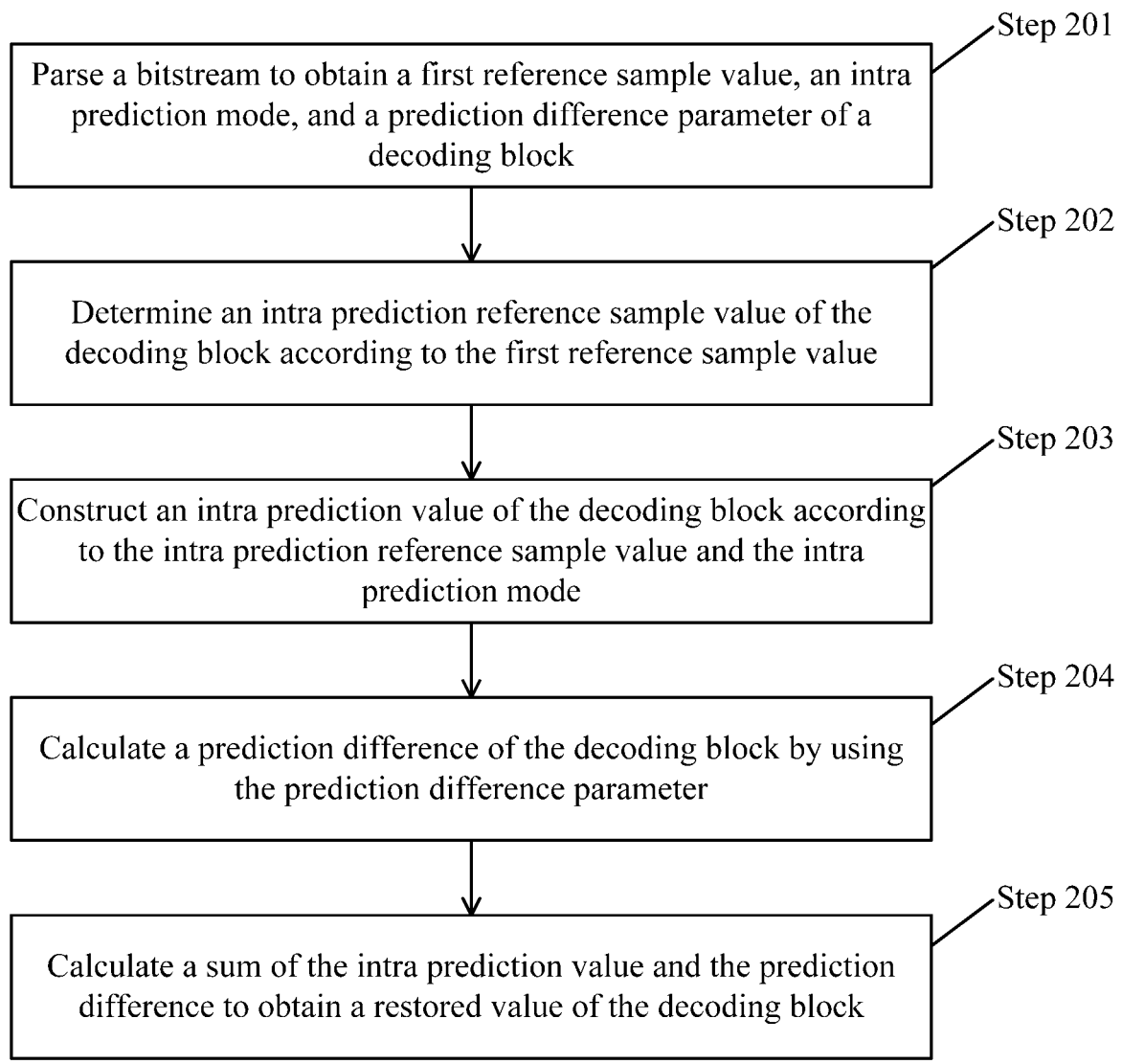
FIG. 2 is a flowchart of an image decoding method according to an embodiment of the present disclosure.

Referring to FIG. 2, an embodiment of the present disclosure provides an image decoding method.

The method includes steps described below.

In step 201, a bitstream is parsed to obtain a first reference sample value, an intra prediction mode, and a prediction difference parameter of a decoding block.

Optionally, the step of parsing the bitstream to obtain the first reference sample value of the decoding block in step 201 includes a step described below.

One or more data units in the bitstream are parsed to obtain the first reference sample value, where each of the one or more data units includes at least one of: one or more parameter sets, a slice header, or a block layer data unit.

In an embodiment, the step of parsing the bitstream to obtain the first reference sample value of the decoding block includes a step described below.

One or more data units in the bitstream are parsed to obtain a sample value usage manner parameter, where the sample value usage manner parameter is used for indicating a usage manner of multiple sample values included in the first reference sample value in a process of setting reference sample values of the decoding block.

The first reference sample value includes a sample value control parameter, where the sample value control parameter includes at least one of: a sequence layer sample value control parameter, an image layer sample value control parameter, a slice layer sample value control parameter, or a block layer sample value control parameter.

In step 202, intra prediction reference sample value of the decoding block is determined according to the first reference sample value.

Optionally, step 202 includes: determining whether reference sample values of the decoding block are existent, where the reference sample values are restored pixel sample values of one or more pixel points adjacent to the decoding block; and in a case where part or all of the reference sample values of the decoding block are non-existent, determining a non-existent reference sample value of the decoding block according to the first reference sample value to obtain the intra prediction reference sample value.

Alternatively, it is determined whether all of reference sample values in a matching block of the decoding block are existent; and in a case where part or all of the reference sample values in the matching block of the decoding block are non-existent, it is determined that part or all of reference sample values of the decoding block are non-existent, and a non-existent reference sample value of the decoding block is determined according to the first reference sample value to obtain the intra prediction reference sample value.

It is to be noted that the matching block of the decoding block is located at a region which is in an image where the decoding block is located and has a same size as the decoding block.

It is understandable that after the non-existent reference sample value of the decoding block is determined according to the first reference sample value, all of the reference sample values of the decoding block are existent.

In practical applications, a method for determining whether a reference sample value of the reference sample values is existent includes at least one of methods described below.

In a case where a position of a reference pixel point corresponding to the reference sample value is in an un-decoded image region in the image where the decoding block is located, it is determined that the reference sample value is non-existent.

In a case where a position of a reference pixel point corresponding to the reference sample value is outside a boundary of the image where the decoding block is located, it is determined that the reference sample value is non-existent.

In the image where the decoding block is located, in a case where a position of a reference pixel point corresponding to the reference sample value is outside a slice where the decoding block is located, it is determined that the reference sample value is non-existent.

In the image where the decoding block is located, in a case where a position of a reference pixel point corresponding to the reference sample value is outside a tile where the decoding block is located, it is determined that the reference sample value is non-existent.

In response to an intra prediction limited mode, in the image where the decoding block is located, in a case where a position of a reference pixel point corresponding to the reference sample value is in a decoding block of a non-intra prediction mode, it is determined that the reference sample value is non-existent.

In an embodiment, the step of determining the non-existent reference sample value of the decoding block according to the first reference sample value includes: setting the non-existent reference sample value of the decoding block by using the first reference sample value.

In an embodiment, the first reference sample value includes the sample value control parameter, and the step of determining the non-existent reference sample value of the decoding block according to the first reference sample value includes: in a case where the sample value control parameter indicates that the non-existent reference sample value is to be constructed by using the first reference sample value, setting the non-existent reference sample value of the decoding block by using the first reference sample value.

In an embodiment, the first reference sample value includes the sample value usage manner parameter, and the step of determining the non-existent reference sample value of the decoding block according to the first reference sample value includes: in a case where the first reference sample value includes at least two sample values, setting the non-existent reference sample value of the decoding block by using the at least two sample values included in the first reference sample value according to the sample value usage manner parameter.

Exemplarily, the first reference sample value includes two sample values, and the step of setting the non-existent reference sample value of the decoding block by using the at least two sample values included in the first reference sample value according to the sample value usage manner parameter or a preset rule includes: setting, according to a preset rule, a non-existent reference sample value at a position of a left adjacent reference pixel point of the decoding block and a non-existent reference sample value at a position of an above adjacent reference pixel point of the decoding block respectively by using the two sample values in the first reference sample value.

Optionally, the step of constructing an intra prediction value of the decoding block according to the intra prediction reference sample value and the intra prediction mode, the method further includes: filtering the intra prediction reference sample value to obtain the filtered reference sample value; and calculating the intra prediction value of the decoding block by using the filtered reference sample value by using the intra prediction mode.

Exemplarily, the step of filtering the intra prediction reference sample value to obtain the filtered reference sample value includes at least methods described below.

In method one, the bitstream is parsed to obtain a filter control parameter, where the filter control parameter is used for indicating whether to filter the intra prediction reference sample value; and in a case where the filter control parameter indicates that the intra prediction reference sample value is to be filtered, the intra prediction reference sample value is filtered to obtain the filtered reference sample value.

In method two, in a case where a size of the decoding block is equal to a preset value, the bitstream is parsed to obtain the filter control parameter; and in the case where the filter control parameter indicates that the intra prediction reference sample value is to be filtered, the intra prediction reference sample value is filtered to obtain the filtered reference sample value.

In method three, in the case where the size of the decoding block is equal to the preset value, the intra prediction reference sample value is filtered to obtain the filtered reference sample value.

In method four, in a case where the intra prediction mode of the decoding block is a preset mode, the bitstream is parsed to obtain the filter control parameter; and in the case where the filter control parameter indicates that the intra prediction reference sample value is to be filtered, the intra prediction reference sample value is filtered to obtain the filtered reference sample value.

In method five, in the case where the intra prediction mode of the decoding block is the preset mode, the intra prediction reference sample value is filtered to obtain the filtered reference sample value.

In method six, in a case where the size of the decoding block is equal to the preset value and the intra prediction mode of the decoding block is the preset mode, the bitstream is parsed to obtain the filter control parameter; and in the case where the filter control parameter indicates that the intra prediction reference sample value is to be filtered, the intra prediction reference sample value is filtered to obtain the filtered reference sample value.

In method seven, in the case where the size of the decoding block is equal to the preset value and the intra prediction mode of the decoding block is the preset mode, the intra prediction reference sample value is filtered to obtain the filtered reference sample value.

In step 203, the intra prediction value of the decoding block is constructed according to the intra prediction reference sample value and the intra prediction mode.

In step 204, a prediction difference of the decoding block is calculated by using the prediction difference parameter.

Optionally, step 204 includes: scaling and transforming the prediction difference parameter to obtain the prediction difference of the decoding block.

In step 205, a sum of the intra prediction value and the prediction difference is calculated to obtain a restored value of the decoding block.

In practical applications, after the restored value of the decoding block is obtained, the method further includes: performing loop filtering on the restored value of the decoding block to obtain a decoded value.

Embodiment Three

Figure 3:
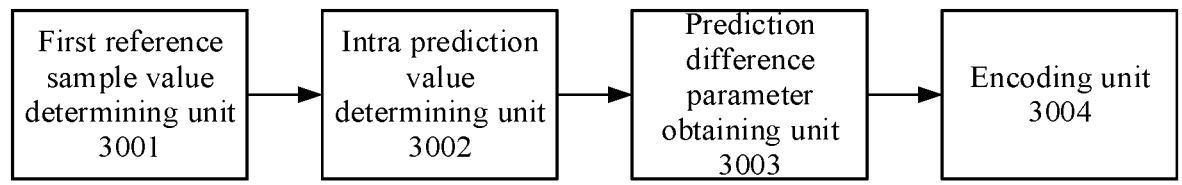
FIG. 3 is a structural diagram of an encoding apparatus according to an embodiment of the present disclosure.

Referring to FIG. 3, an embodiment of the present disclosure provides an image encoding apparatus including a first reference sample value determining unit 3001, an intra prediction value determining unit 3002, a prediction difference parameter obtaining unit 3003, and an encoding unit 3004.

The first reference sample value determining unit 3001 is configured to determine a first reference sample value of an encoding block according to a pixel sample value in the encoding block.

The intra prediction value determining unit 3002 is configured to determine an intra prediction mode of the encoding block according to the first reference sample value determined by the first reference sample value determining unit 3001 and calculate an intra prediction value of the encoding block.

The prediction difference parameter obtaining unit 3003 is configured to obtain a prediction difference parameter according to original values of the encoding block and the intra prediction value calculated by the intra prediction value determining unit 3002.

The encoding unit 3004 is configured to encode the first reference sample value determined by the first reference sample value determining unit 3001, the intra prediction mode determined by the intra prediction value determining unit 3002, and the prediction difference parameter obtained by the prediction difference parameter obtaining unit 3003 and write encoded bits into a bitstream.

Optionally, the prediction difference parameter obtaining unit 3003 is exemplarily configured to calculate difference values between the original values and the intra prediction value of the encoding block to obtain prediction difference values of the encoding block and transform and quantize the prediction difference values to obtain the prediction difference parameter.

Optionally, the first reference sample value determining unit 3001 is exemplarily configured to: determine whether reference sample values of the encoding block are existent, where the reference sample values are restored pixel sample values of one or more pixel points adjacent to the encoding block; and in a case where part or all of the reference sample values of the encoding block are non-existent, determine the first reference sample value of the encoding block according to the pixel sample value in the encoding block.

Alternatively, the first reference sample value determining unit 3001 is exemplarily configured to: determine whether all of reference sample values in a matching block of the encoding block are existent; and in a case where part or all of the reference sample values in the matching block of the encoding block are non-existent, determine that part or all of reference sample values of the encoding block are non-existent, and determine the first reference sample value of the encoding block is determined according to the pixel sample value in the encoding block.

Optionally, the first reference sample value determining unit 3001 is exemplarily configured to determine the first reference sample value according to the pixel sample value in the encoding block by a soft decision method.

Optionally, the first reference sample value determining unit 3001 is exemplarily configured to: in response to determining that all of the reference sample values of the encoding block are non-existent, set the first reference sample value to an average value of the original values of the encoding block; and in response to determining that one part of the reference sample values of the encoding block are non-existent, set the first reference sample value to a difference value between the average value of the original values of the encoding block and an average value of existent reference sample values that are the other part of the reference sample values of the encoding block.

Optionally, the intra prediction value determining unit 3002 is exemplarily configured to: set a non-existent reference sample value of the encoding block by using the first reference sample value; and determine, according to the reference sample values of the encoding block, the intra prediction mode of the encoding block by a rate-distortion optimization method, and calculate the intra prediction value of the encoding block by using the intra prediction mode.

Optionally, the intra prediction value determining unit 3002 is exemplarily configured to: set the non-existent reference sample value of the encoding block by using the first reference sample value; filter the reference sample values of the encoding block to obtain the filtered reference sample values; and determine, according to the filtered reference sample values, the intra prediction mode of the encoding block by the rate-distortion optimization method, and calculate the intra prediction value of the encoding block by using the intra prediction mode.

Optionally, the encoding unit 3004 is exemplarily configured to: encode the first reference sample value to obtain an encoded bit of the first reference sample value; and write the encoded bit of the first reference sample value into a data unit in the bitstream, where the data unit in the bitstream includes at least one of one or more parameter sets, a slice header, or a block layer data unit.

Embodiment Four

Figure 4:
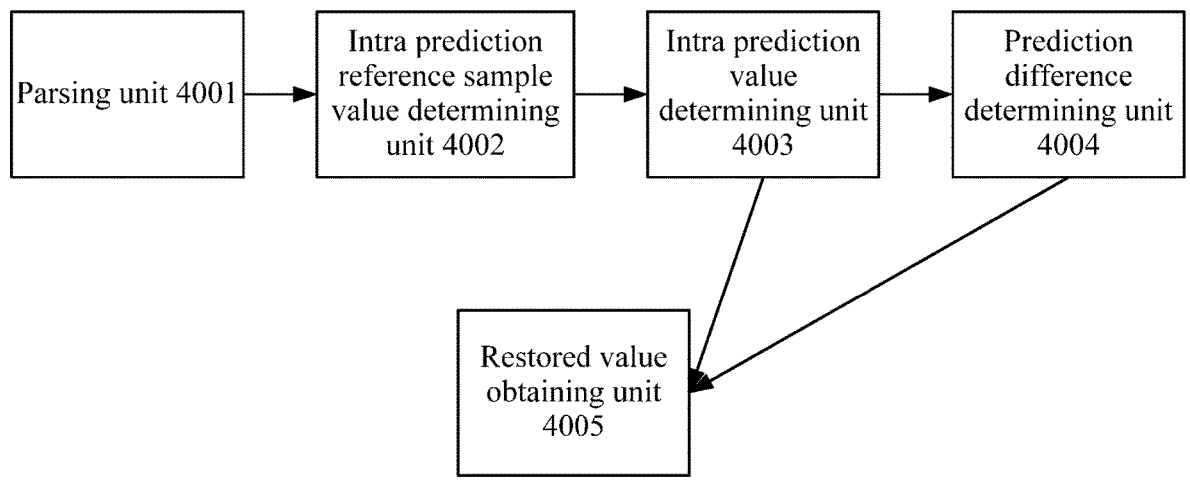
FIG. 4 is a structural diagram of a decoding apparatus according to an embodiment of the present disclosure.

Referring to FIG. 4, an embodiment of the present disclosure provides an image decoding apparatus including a parsing unit 4001, an intra prediction reference sample value determining unit 4002, an intra prediction value determining unit 4003, a prediction difference determining unit 4004, and a restored value obtaining unit 4005.

The parsing unit 4001 is configured to parse a bitstream to obtain a first reference sample value, an intra prediction mode, and a prediction difference parameter of a decoding block.

The intra prediction reference sample value determining unit 4002 is configured to determine intra prediction reference sample value of the decoding block according to the first reference sample value parsed by the parsing unit 4001.

The intra prediction value determining unit 4003 is configured to construct an intra prediction value of the decoding block according to the intra prediction reference sample value determined by the intra prediction reference sample value determining unit 4002 and the intra prediction mode parsed by the parsing unit 4001.

The prediction difference determining unit 4004 is configured to calculate a prediction difference of the decoding block by using the prediction difference parameter parsed by the parsing unit 4001.

The restored value obtaining unit 4005 is configured to calculate a sum of the intra prediction value constructed by the intra prediction value determining unit 4003 and the prediction difference calculated by the prediction difference determining unit 4004 to obtain a restored value of the decoding block.

Optionally, the parsing unit 4001 is exemplarily configured to parse one or more data units in the bitstream to obtain the first reference sample value, where each of the one or more data units includes at least one of one or more parameter sets, a slice header, or a block layer data unit.

Optionally, the intra prediction value determining unit 4003 is configured to: filter the intra prediction reference sample value to obtain the filtered reference sample value; and calculate, according to the intra prediction mode, the intra prediction value of the decoding block by using the filtered reference sample values.

Optionally, the intra prediction reference sample value determining unit 4002 is exemplarily configured to: determine whether reference sample values of the decoding block are existent, where the reference sample values are restored pixel sample values of one or more pixel points adjacent to the decoding block; and in a case where part or all of the reference sample values of the decoding block are non-existent, determine a non-existent reference sample value of the decoding block according to the first reference sample value to obtain the intra prediction reference sample value.

Alternatively, the intra prediction reference sample value determining unit 4002 is exemplarily configured to: determine whether all of reference sample values in a matching block of the decoding block are existent; and in a case where part or all of the reference sample values in the matching block of the decoding block are non-existent, determine that part or all of reference sample values of the decoding block are non-existent, and determine a non-existent reference sample value of the decoding block according to the first reference sample value to obtain the intra prediction reference sample value.

Optionally, the prediction difference determining unit 4004 is exemplarily configured to scale and transform the prediction difference parameter to obtain the prediction difference of the decoding block.

Optionally, the restored value obtaining unit 4005 is exemplarily configured to perform loop filtering on the restored value of the decoding block to obtain a decoded value.

Embodiment Five

Figure 5:
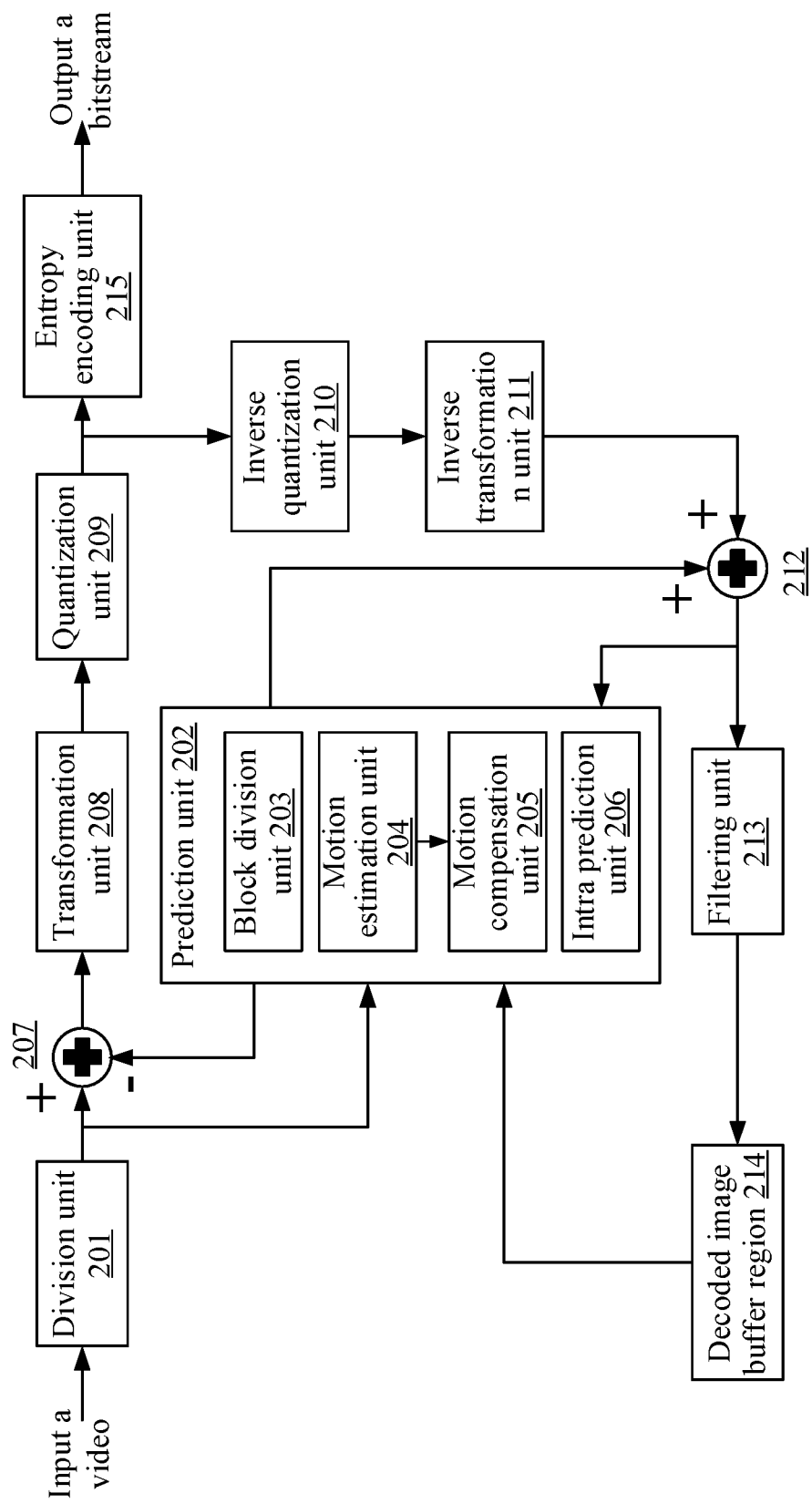
FIG. 5 is a schematic diagram illustrating the system architecture of an encoder according to an embodiment of the present disclosure.

Referring to FIG. 5, an embodiment of the present disclosure provides a structural diagram of an encoder. Exemplarily, the encoder includes a division unit 201, a prediction unit 202, a first adder 207, a transformation unit 208, a quantization unit 209, an inverse quantization unit 210, an inverse transformation unit 211, a second adder 212, a filtering unit 213, a decoded image buffer region 214, and an entropy encoding unit 215. The prediction unit 202 includes a block division unit 203, a motion estimation unit 204, a motion compensation unit 205, and an intra prediction unit 206.

It is to be noted that an input of the encoder is a video, and an output of the encoder is a bitstream generated by encoding the inputted video. Since the video is an image sequence composed of images, an encoding process of the encoder is to sequentially encode the images in the inputted video in an encoding order. The encoding order is determined by parameters such as a prediction structure that are set in a configuration file of the encoder. The encoding order of the images in the video (corresponding to a decoding order of a decoder) may be the same as or different from a playback order of the images.

The division unit 201 is configured to receive the images in the video, divide the images in the video according to a preset configuration, and output a maximum encoding unit and attribute information related to the maximum encoding unit.

It is understandable that the image may be divided into one or more slices, and each slice may include an integer number of maximum encoding units or may include a non-integer number of maximum encoding units. The maximum encoding unit is a square image region. Of course, the image may also be divided into one or more tiles, and each tile may include an integer number of maximum encoding units or may include a non-integer number of maximum encoding units.

It is to be noted that the division unit 201 may be configured to divide the image in a fixed manner or dynamically adjust an image division manner. For example, in order to adapt to a maximum transmission unit (MTU) of a network, a dynamic slice division manner is used, so as to ensure that the number of encoded bits for each slice does not exceed the limit of the MTU.

The prediction unit 202 is configured to subdivide the maximum encoding unit divided by the division unit 201 into one or more encoding blocks and determine a prediction value of each of the one or more encoding blocks.

It is understandable that an input of the prediction unit 202 includes the maximum encoding unit and the attribute information related to the maximum encoding unit outputted by the division unit 201. The attribute information related to the maximum encoding unit includes a position of the maximum encoding unit in the image and a position of the maximum encoding unit in the slice/tile, etc. In practical applications, a manner for dividing the maximum encoding unit includes a quadtree division, a binary tree division, and a trinary tree division.

It is to be further noted that the prediction unit 202 may further divide the obtained encoding block into more encoding blocks. The encoding block may be further divided into one or more prediction blocks to determine the prediction value.

Optionally, the step in which the prediction unit 202 determines the prediction value of the encoding block exemplarily includes: determining an inter prediction value of the encoding block according to a decoded image in the decoded image buffer region 214; or determining an intra prediction value of the encoding block according to a restored portion of a current to-be-encoded image, which is outputted by the second adder 212 (and not processed by the filtering unit 213).

Exemplarily, the step in which the prediction unit 202 determines the prediction value of the encoding block further includes: determining the prediction value of the encoding block by the rate-distortion optimization (RDO) method, and obtaining output parameters related to inter prediction and intra prediction that are used by the prediction value.

Exemplarily, the prediction unit 202 includes the block division unit 203, the motion estimation unit 204, the motion compensation unit 205, and the intra prediction unit 206. The four subunits in the prediction unit 202 are described below, separately.

The block division unit 203 is configured to determine a block division manner of the encoding block in an encoding process of the maximum encoding unit.

In practical applications, the division manner may adopt one or more of the quadtree division, the binary tree division, or the trinary tree division.

It is to be further noted that the block division unit 203 may divide the encoding block into one or more encoding blocks and further divide the obtained encoding block into more encoding blocks. The encoding block may also be divided into one or more prediction blocks.

Exemplarily, the block division unit 203 determines the division manner of the encoding block by the RDO method.

An output parameter of the block division unit includes the division manner parameters of the encoding block, and these parameters are used for indicating the division manner of the encoding block.

The motion estimation unit 204 is configured to use one or more decoded images in the decoded image buffer region 214 as reference images, construct one or more reference image lists according to the reference images, and determine a matching block of the encoding block in the reference images.

Each reference image list includes one or more reference images.

In practice, the output of the motion estimation unit 204 includes parameters for indicating the position of the matching block which may include a reference image list indication, a reference index, and a motion vector (MV), etc. The reference image list indication is used for indicating a reference image list where a reference image including the matching block is located, the reference index is used for indicating the reference image including the matching block in the reference image list, and the MV is used for indicating an offset between the relative positions of the encoding block and the matching block in the same coordinate system of image pixel points.

The motion compensation unit 205 is configured to construct the prediction value of the encoding block according to the matching block and calculate a difference value between the encoding block and the prediction value.

In practice, the output of the motion compensation unit 205 further includes parameters for constructing the prediction value of the encoding block, such as a weighted value of the matching block and a filter type and a parameter for filtering the matching block.

Exemplarily, the motion estimation unit 204 and the motion compensation unit 205 jointly use the RDO method to determine the matching block with best rate-distortion performance for the encoding block and output parameters of the motion estimation unit 204 and the motion compensation unit 205.

Optionally, the motion estimation unit 204 and the motion compensation unit 205 may obtain the intra prediction value of the encoding block by using the current to-be-encoded image where the encoding block is located as the reference image.

It is to be noted that the intra prediction refers to a prediction value obtained by simply using data in the image where the encoding block is located as reference. In this case, the motion estimation unit 204 and the motion compensation unit 205 use the partially restored portion of the current to-be-encoded image, that is, the portion that has not been processed by the filtering unit 213. Input data may come from an output of the second adder 212, for example, an image buffer region is used for storing data outputted by the second adder 212. Optionally, the image buffer region is a special image buffer region in the decoded image buffer region 214.

The intra prediction unit 206 is configured to determine the intra prediction value of the encoding block.

In practical applications, the intra prediction unit 206 determines intra prediction reference sample value for the encoding block according to the partially restored portion of the image where the encoding block is located and calculates the intra prediction value of the encoding block by using the intra prediction reference sample value as the input value of a filter. Here, the filter may be an interpolation filter or a low-pass filter (such as a filter for calculating a DC value). Optionally, the intra prediction unit 206 determines a method for calculating the intra prediction value of the encoding block (that is, an intra prediction mode) and the intra prediction value by the RDO method.

The intra prediction unit 206 determines whether partially restored pixel sample values adjacent to the encoding block are existent. When the intra prediction unit 206 determines that all adjacent sample values of the encoding block are existent, the intra prediction unit 206 sets the intra prediction reference sample value to the adjacent sample values or the filtered adjacent sample values. Conversely, when the intra prediction unit 206 determines that all or part of the sample values for the encoding block are non-existent, the intra prediction unit 206 determines a first reference sample value and determines the intra prediction reference sample value of the encoding block by using the first reference sample value.

The intra prediction unit 206 determines whether adjacent sample values at the positions of adjacent pixel points are existent according to the positions of the adjacent pixel points corresponding to the reference sample values used for the intra prediction mode. Generally, the intra prediction unit 206 determines whether an adjacent sample value of the encoding block is existent in a manner described below.

1. When a pixel at the position of a reference pixel point for the encoding block has not been encoded, the corresponding adjacent sample value is non-existent.

2. When the encoding block is located at the boundary of the image, no adjacent sample value is existent at the position of a reference pixel point outside the boundary of the image. For example, when the encoding block is located at the upper boundary of the image, an above adjacent sample value of the encoding block is non-existent.

3. An adjacent sample value located in a slice different from the slice where the encoding block is located is non-existent.

4. An adjacent sample value located in a tile different from the tile where the encoding block is located is non-existent.

5. In the case where the intra prediction is limited, an adjacent sample value located in an encoding block of non-intra prediction encoding is non-existent.

It is to be noted that the intra prediction unit 206 determines the first reference sample value by multiple methods. One method is that the intra prediction unit 206 sets the value of the first reference sample value to a non-existent adjacent sample value of the encoding block (for example, when the encoding block is located at the boundary of the slice, the first reference sample value is set by using the adjacent sample value of the encoding block that is in a different slice). Another method is that the intra prediction unit 206 determines the first reference sample value according to a to-be-encoded pixel sample value in the encoding block. Another method is that the intra prediction unit 206 calculates the first reference sample value during the RDO by a soft decision method.

A soft decision may be expressed by using the following constrained optimization problem:

Constrained optimization 1:

$$\min D = \Sigma_k d(x_k, p_k) \; s.t. \; R \le R_C \qquad (1)$$

where D denotes encoding distortion of the encoding block; k is a traversal range including all pixels in the encoding block; d(a, b) denotes an error value between a and b, where a usable error criterion includes a mean square error (MSE), a sum of absolute value (SAD), or a perceptual error related to a human visual system (HVS); $x_k$ is the to-be-encoded pixel sample value in the encoding block; $p_k$ is a prediction value of $x_k$, where the value of $p_k$ is calculated according to the intra prediction mode by using the intra prediction reference sample value by the intra prediction unit 206 during the intra prediction; R denotes an encoding bit overhead of the encoding block and includes an overhead of information about an encoding mode of the encoding block, an overhead of the first reference sample value, and an encoding overhead of prediction difference values, etc., where the value of R may be estimated according to the mode, prediction difference values, and quantization parameter of the encoding block (for example, by using a rate-distortion (RD) model) or obtained by encoding the encoding block in practice; and $R_C$ is an upper limit of the encoding bit overhead of the encoding block and may be determined by the encoder through a bit allocation process of the encoding block in a rate control (RC) unit.

It is to be noted that in constrained optimization 1, according to a calculation process of the intra prediction, the value of $p_k$ is determined according to the intra prediction reference sample value and the intra prediction mode, and the intra prediction reference sample value is determined by the first reference sample value. Therefore, the intra prediction unit 206 can determine both the optimal first reference sample value and the intra prediction mode by solving constrained optimization 1. The intra prediction unit 206 may solve constrained optimization 1 by using related algorithms.

It is understandable that in order to reduce computational complexity, constrained optimization 1 may be transformed into an unconstrained optimization problem by using a Lagrange factor:

Unconstrained optimization 1:

$$(r,m)_{opt}=\arg\min(D+\lambda \cdot R) \quad (2)$$

where r is the first reference sample value, m is the intra prediction mode of the encoding block, D and R are the same as those in constrained optimization 1, and λ is the Lagrange factor. A common method is that the encoder may determine the value of λ through a functional relationship between λ and a quantization parameter (QP). The encoder may determine the value of the QP in the RC unit. The intra prediction unit 206 can determine both the optimal first reference sample value and the intra prediction mode by solving unconstrained optimization 1. The intra prediction unit 206 may solve unconstrained optimization 1 by using existing algorithms.

Generally, compared with constrained optimization 1, unconstrained optimization 1 is solved by the intra prediction unit 206 with lower computational complexity. Further, based on unconstrained optimization 1, the intra prediction unit 206 may solve unconstrained optimization 1 by an approximation method according to the positions of adjacent pixels of the encoding block and the used intra prediction mode, thereby further reducing the computational complexity.

Exemplarily, the intra prediction unit 206 may determine one or more first reference sample values for a decoding block. In the case where the first reference sample value includes multiple sample values, a usage manner indication parameter of the sample values in the first reference sample value is further determined for indicating the used sample value in the first reference sample value in the process of determining intra prediction reference sample values at different positions. For example, different first reference sample values are used for a left adjacent sample value and an above adjacent sample value of the encoding block. Here, the indication parameter is also included in the first reference sample value.

Optionally, the intra prediction unit 206 may derive the indication parameter according to a preset rule. For example, when the first reference sample value includes two reference sample values, the preset rule used by the intra prediction unit 206 is that according to an order in which the sample values in the first reference sample value are written into the bitstream, the first sample value is used for constructing a left adjacent intra prediction reference sample value of the encoding block, and the second sample value is used for constructing an above adjacent intra-frame reference sample value of the encoding block.

Optionally, the intra prediction unit 206 may also derive the indication parameter according to the position of the encoding block in the image and the intra prediction mode of the encoding block.

For example, when the first reference sample value includes two reference sample values, the preset rule used by the intra prediction unit 206 is that according to the order in which the sample values in the first reference sample value are written into the bitstream, the first sample value is used for constructing the left adjacent intra prediction reference sample value of the encoding block, and the second sample value is used for constructing the above adjacent intra-frame reference sample value of the encoding block; when the encoding block is located at the left boundary of the image (the left adjacent sample value of the encoding block does not exist in the image) rather than the upper boundary of the image (the above adjacent sample value of the encoding block exists in the image), if the upper boundary of the encoding block is the boundary of a slice or a tile (the above adjacent sample value of the encoding block cannot be used as the intra prediction reference sample value), in the case where the encoding block uses the DC mode, the second sample value is used as the left adjacent sample value and the above adjacent sample value of the encoding block in the DC mode.

Optionally, the intra prediction unit 206 searches the partially restored portion of the image where the encoding block is located for the matching block of the encoding block and uses the matching block as the intra prediction value of the encoding block.

In this case, an output parameter of the intra prediction unit 206 further includes information for indicating the position of the matching block, such as a relative offset between the positions of the encoding block and the matching block in the image in the same image coordinate system. It is to be noted that the output parameter of the intra prediction unit 206 includes the first reference sample value and a parameter for indicating the intra prediction mode.

The first adder 207 is configured to calculate prediction difference values between original values of the encoding block and the prediction value. The prediction difference values are input values of the transformation unit 208.

The transformation unit 208 is configured to transform the prediction difference values and output transformation coefficients obtained after the prediction difference values are transformed.

In practical applications, the transformation unit 208 may transform the prediction difference values by one or more transformation methods. From the perspective of signal processing, each transformation method may be represented by a transformation matrix. The transformation unit 208 may use a rectangular block with the same size and shape as the encoding block (a square is a special case of a rectangle here) as a transformation block of the prediction difference or divide the prediction difference into multiple rectangular blocks (including the case where a height is one pixel) and sequentially transform the rectangular blocks.

Optionally, the transformation unit 208 may transform the prediction difference values multiple times. In the case where multiple transformation methods may be used, the prediction difference is divided into multiple rectangular blocks for transformation, or the prediction difference values are transformed multiple times, the transformation unit 208 determines a transformation parameter for the prediction difference values by the RDO method, where the transformation parameter is used for indicating a manner of executing a transformation process. The transformation unit 208 uses the transformation parameter as an output parameter.

The quantization unit 209 is configured to quantize the transformation coefficients which are outputted by the transformation unit 208 and obtained after the prediction difference values are transformed and output the quantized values of the transformation coefficients.

Generally, quantizers usable by the quantization unit include a scalar quantizer and a vector quantizer. In a video encoder, the quantization unit 209 quantizes the transformation coefficients with the scalar quantizer, where a quantization parameter of the quantizer is determined by a code control unit. For example, the code control unit may determine a quantization step of the quantizer by an existing rate control method and determine the QP according to a correspondence relationship between the quantization step and the QP in the encoder. The related parameter of the quantization unit 209 is the QP.

The inverse quantization unit 210 is configured to perform a scaling operation on the quantized values of the transformation coefficients using the same QP as the quantization unit 209 to obtain restored values of the transformation coefficients.

The inverse transformation unit 211 is configured to process the restored values of the transformation coefficients using an inverse transform of a transform used by the transformation unit 208 to obtain restored values of the prediction differences.

The second adder 212 is configured to calculate a restored value of the encoding block according to the restored values of the prediction differences and the prediction value of the encoding block outputted by the prediction unit 202 and store the restored value of the encoding block into the image buffer region.

The image buffer region may be a storage space allocated separately in the image encoding process or an image buffer region in the decoded image buffer region 214.

The filtering unit 213 is configured to filter data in the image buffer region to obtain a decoded image of the image.

In practice, the filtering unit 213 may be formed by cascading one or more filters. For example, in the H.265/HEVC standard, the filtering unit 213 is formed by cascading two filters, a deblocking filter and a sample adaptive additive offset (SAO) compensation filter. The filtering unit 213 may also include a neural network filter.

Optionally, the filtering unit 213 may filter the data in the image buffer region in an image layer, that is, the data in the image buffer region is filtered after restored values of all encoding blocks in the image are written into the image buffer region.

Optionally, the filtering unit 213 may filter the data in the image buffer region in a block layer, that is, when restored data of a certain encoding block is no longer used as reference data for a subsequent encoding block, the restored data of the encoding block is filtered.

The filtering unit 213 determines a filter parameter by the RDO method and then uses the filter parameter as an output parameter of the filtering unit 213. The filter parameter includes indication information of a filter used, a filter coefficient, and a control parameter of the filter.

The decoded image buffer region 214 is configured to store the decoded image outputted by the filtering unit 213.

The decoded image buffer region 214 determines parameter instructions related to the management of decoded images that are configured for controlling operations such as storage duration and output of the decoded image in the decoded image buffer region 214. In this embodiment, these parameter commands may be used as output parameters of the decoded image buffer region 214.

The entropy encoding unit 215 is configured to perform binarization and entropy encoding on encoding data of the image, transform parameters into fields consisting of one or more bits "0" and "1" that comply with standards, and organize the fields into the bitstream according to a syntax structure of the bitstream in the standards.

Entropy encoding data includes texture data and non-texture data of the image. The texture data is mainly the quantized values of the transformation coefficients of the encoding block, and the non-texture data includes all other data except the texture data, including output parameters of the units in the encoder, parameter sets, header information, and auxiliary information, etc. The entropy encoding unit 215 generates the bitstream according to a bitstream organization form in video encoding standards.

Embodiment Six

Figure 6:
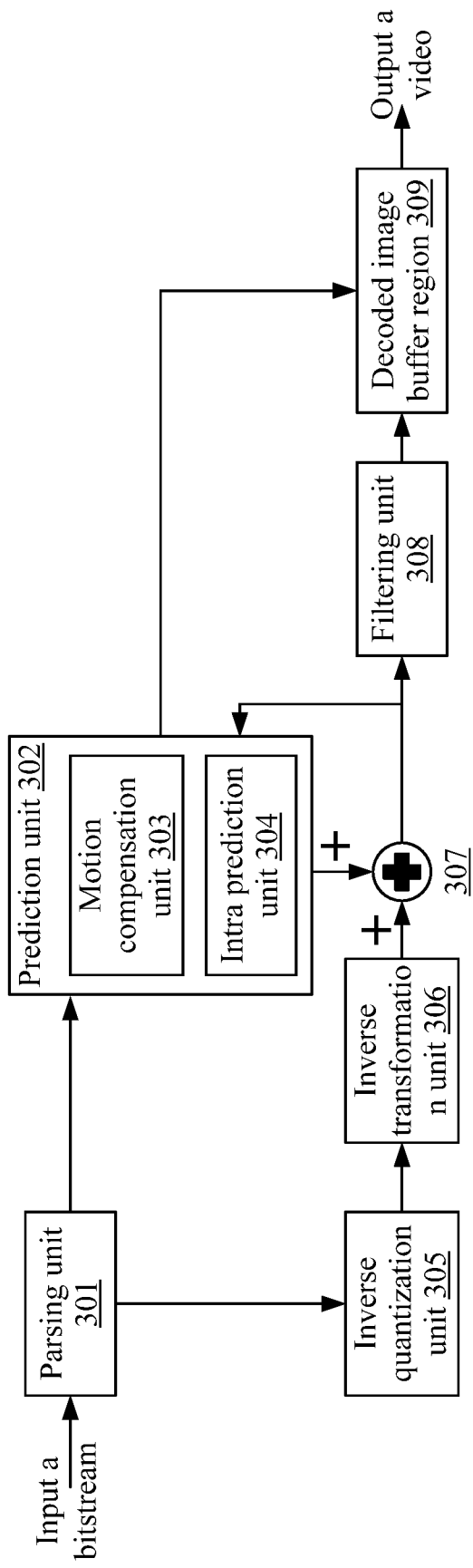
FIG. 6 is a schematic diagram illustrating the system architecture of a decoder according to an embodiment of the present disclosure.

Referring to FIG. 6, an embodiment of the present disclosure provides a structural diagram illustrating the system architecture of a decoder configured to decode a bitstream generated by the encoder described above. The decoder includes a parsing unit 301, a prediction unit 302, an inverse quantization unit 305, an inverse transformation unit 306, an adder 307, a filtering unit 308, and a decoded image buffer region 309. The prediction unit 302 includes a motion compensation unit 303 and an intra prediction unit 304.

It is to be noted that an input of the decoder is the bitstream, and an output of the decoder is a decoded video generated by the decoder decoding the inputted bitstream.

The parsing unit 301 is configured to parse the inputted bitstream and transform one or more bit strings of "0" and "1" corresponding to each field in the bitstream into the values of the corresponding parameters by an entropy decoding method and a binarization method specified in standards. The parsing unit 301 derives the values of other parameters according to the values of the parameters. For example, when the value of a flag bit in the bitstream indicates that a decoding block is the first decoding block in an image, an address parameter, in the image, of the first decoding block in a slice where the decoding block is located is set to 0.

In an embodiment, the parsing unit 301 transmits parameters for constructing a prediction value of the decoding block to the prediction unit 302. Here, the parameters for constructing the prediction value of the decoding block include output parameters of a division unit 201 and a prediction unit 202 in the encoder described above.

In an embodiment, the parsing unit 301 transmits parameters for constructing a restored value of a prediction difference of the decoding block to the inverse quantization unit 305 and the inverse transformation unit 306. Here, the parameters for constructing the restored value of the prediction difference of the decoding block include output parameters of a transformation unit 208 and a quantization unit 209 in the encoder described above and quantized values of transformation coefficients outputted by the quantization unit 209 in the encoder described above.

The prediction unit 302 is configured to construct the prediction value of the decoding block according to the parameters for constructing the prediction value of the decoding block.

It is to be noted that an input of the prediction unit 302 further includes a partially restored portion (not processed by the filtering unit 308) of a current to-be-decoded image outputted by the adder 307 and a decoded image stored in the decoded image buffer region 309.

Exemplarily, when the parameters indicate that the decoding block uses inter prediction, the prediction unit 302 constructs one or more reference image lists by the same method as the motion estimation unit 204 in the encoder described above. Each reference image list includes one or more reference images from the decoded image buffer region 309. The motion compensation unit 303 determines one or more matching blocks of the decoding block in the reference images according to a reference image list indication, a reference index, and a motion vector transmitted by the parsing unit 301 and determines an inter prediction value by the same method as a motion compensation unit 205 in the encoder described above. The prediction unit 302 uses the inter prediction value outputted by the motion compensation unit 303 as the prediction value of the decoding block.

Optionally, the motion compensation unit 303 may obtain an intra prediction value of the decoding block by using the current to-be-decoded image where the decoding block is located as the reference image.

Here, intra prediction refers to a prediction value obtained by simply using data in the image where the decoding block is located as reference. In this case, the motion compensation unit 303 uses the partially restored portion of the current to-be-decoded image (not processed by the filtering unit 308). Input data may come from an output of the adder 307, for example, an image buffer region is used for storing data outputted by the adder 307. Optionally, the image buffer region is a special image buffer region in the decoded image buffer region 309.

Exemplarily, when the parameters indicate that the decoding block uses the intra prediction, the prediction unit 302 constructs the prediction value of the decoding block according to the parameters for constructing the prediction value of the decoding block. The intra prediction unit 304 obtains a first reference sample value among the parameters for constructing the prediction value of the decoding block. When the intra prediction unit 304 determines that all adjacent sample values of the decoding block are existent, the intra prediction unit 304 sets intra prediction reference sample value to the adjacent sample value or the filtered adjacent sample value. Conversely, when the intra prediction unit 304 determines that all or part of the sample values for the decoding block are non-existent, the intra prediction unit 304 determines the intra prediction reference sample value of the decoding block by using the first reference sample value.

The intra prediction unit 304 determines whether an adjacent sample value of the decoding block is existent by using a condition described below.

When a pixel at the position of a reference pixel point for the decoding block has not been decoded, the corresponding adjacent sample value is non-existent.

When the decoding block is located at the boundary of the image, no adjacent sample value is existent at the position of a reference pixel point outside the boundary of the image. For example, when the decoding block is located at the upper boundary of the image, an above adjacent sample value of the decoding block is non-existent.

An adjacent sample value located in a slice different from the slice where the decoding block is located is non-existent.

An adjacent sample value located in a tile different from the tile where the decoding block is located is non-existent.

In the case where the intra prediction is limited, an adjacent sample value located in a decoding block for non-intra prediction decoding is non-existent.

Exemplarily, the intra prediction unit 304 sets the first reference sample value by multiple methods. One method is that the intra prediction unit 304 sets a non-existent pixel sample value at the position of an intra prediction reference pixel point for the decoding block to the value of the first reference sample value. If the first reference sample value includes only one sample value, when all or part of the adjacent sample values of the decoding block are non-existent, the intra prediction unit 304 sets an adjacent sample value of the decoding block to the value of the first reference sample value.

Optionally, if the first reference sample value includes multiple sample values, the intra prediction unit 304 may determine the sample value to be used in the first reference sample value in the process of determining intra prediction reference sample values at different positions according to a usage manner indication parameter of reference sample values in the first reference sample value. For example, different first reference sample values are used for a left adjacent sample value and an above adjacent sample value of the decoding block.

Optionally, the intra prediction unit 304 may derive the indication parameter according to a preset rule. For example, when the first reference sample value includes two reference sample values, the preset rule used by the intra prediction unit 304 is that according to an order of the sample values in the first reference sample value in the bitstream (that is, an order in which the two sample values are parsed), the first sample value is used for constructing a left adjacent intra prediction reference sample value of the decoding block, and the second sample value is used for constructing an above adjacent intra-prediction reference sample value of the decoding block.

Optionally, the intra prediction unit 304 may derive the indication parameter according to the position of the decoding block in the image and an intra prediction mode of the decoding block. For example, when the first reference sample value includes two reference sample values, the preset rule used by the intra prediction unit 304 is that according to the order of the sample values in the first reference sample value in the bitstream (that is, the order in which the two sample values are parsed), the first sample value is used for constructing the left adjacent intra prediction reference sample value of the decoding block, and the second sample value is used for constructing the above adjacent intra-frame reference sample value of the decoding block; when the decoding block is located at the left boundary of the image (the left adjacent sample value of the decoding block does not exist in the image) rather than the upper boundary of the image (the above adjacent sample value of the decoding block exists in the image), if the upper boundary of the decoding block is the boundary of a slice or a tile (the above adjacent sample value of the decoding block cannot be used as the intra prediction reference sample value), in the case where the encoding block uses the DC mode, the second sample value is used as the left adjacent sample value and the above adjacent sample value of the decoding block in the DC mode.

The intra prediction unit 304 determines the intra prediction mode according to the parameters for constructing the prediction value of the decoding block and calculates the intra prediction value of the decoding block using the intra prediction reference sample value by the same method as the intra prediction unit 206 in the encoder described above. Optionally, when the parameters for constructing the prediction value of the decoding block indicate that the prediction value of the decoding block is constructed using a matching block, the intra prediction unit 304 obtains an offset between the positions of the decoding block and the matching block from the parameters for constructing the prediction value of the decoding block, obtains the matching block from the current partially-decoded image where the decoding block is located, and sets the matching block as the intra prediction value of the decoding block. The prediction unit 302 uses the intra prediction value outputted by the intra prediction unit 304 as the prediction value of the decoding block.

The inverse quantization unit 305 is configured to receive a QP and the quantized values of the transformation coefficients among the parameters for constructing the restored value of the prediction difference of the decoding block. The inverse quantization unit 305 scales the quantized values of the transformation coefficients using the QP to obtain restored values of the transformation coefficients. Therefore, the inverse quantization unit in the decoder may also be referred to as a scaling unit.

The inverse quantization unit 305 outputs to the inverse transformation unit 306 the restored values of the transformation coefficients and a transformation parameter outputted by the transformation unit 208 in the encoder described above and being among the parameters for constructing the restored value of the prediction difference of the decoding block.

The inverse transformation unit 306 calculates the restored value of the prediction difference of the decoding block by the same method as the inverse transformation unit 211 in the encoder described above.

It is to be noted here that "inverse transformation" here is named relative to the "transformation" in the encoder. In video encoding standards, a transformation method used by the inverse transformation unit 306 is specified, that is, a transformation method used by the decoder to transform the restored values of the transformation coefficients into the restored value of the prediction difference.

The adder 307 calculates a restored value of the decoding block according to the restored value of the prediction difference outputted by the inverse transformation unit 306 and the prediction value of the decoding block outputted by the prediction unit 302 and stores the restored value of the decoding block into the image buffer region.

The image buffer region may be a storage space allocated separately in the image decoding process or an image buffer region in the decoded image buffer region 309.

The filtering unit 308 is configured to receive filter parameters outputted by the parsing unit 301 and filter data in the image buffer region according to the filter parameters to obtain a decoded image of the image.

The filter parameters are output parameters of a filtering unit 213 in the encoder described above and include indication information of a filter used, a filter coefficient, and a control parameter of the filter.

In practice, the filtering unit 308 may be formed by cascading one type or more types of filters. For example, in the H.265/HEVC standard, the filtering unit 308 is formed by cascading two filters, a deblocking filter and a sample adaptive additive offset compensation filter. The filtering unit 308 may also include a neural network filter. Optionally, the filtering unit 308 may filter the data in the image buffer region in an image layer, that is, the data in the image buffer region is filtered after restored values of all decoding blocks in the image are written into the image buffer region. Optionally, the filtering unit 308 may filter the data in the image buffer region in a block layer, that is, when restored data of a certain decoding block is no longer used as reference data for a subsequent decoding block, the restored data of the decoding block is filtered.

The decoded image buffer region 309 is configured to store the decoded image outputted by the filtering unit 308.

In an embodiment, the decoder controls operations such as storage duration and output of the decoded image in the decoded image buffer region 309 by using parameter instructions related to the management of decoded images and outputted by the parsing unit 301 (that is, output parameters of the decoded image buffer region 214 in the encoder described above).

Embodiment Seven

Figure 7:
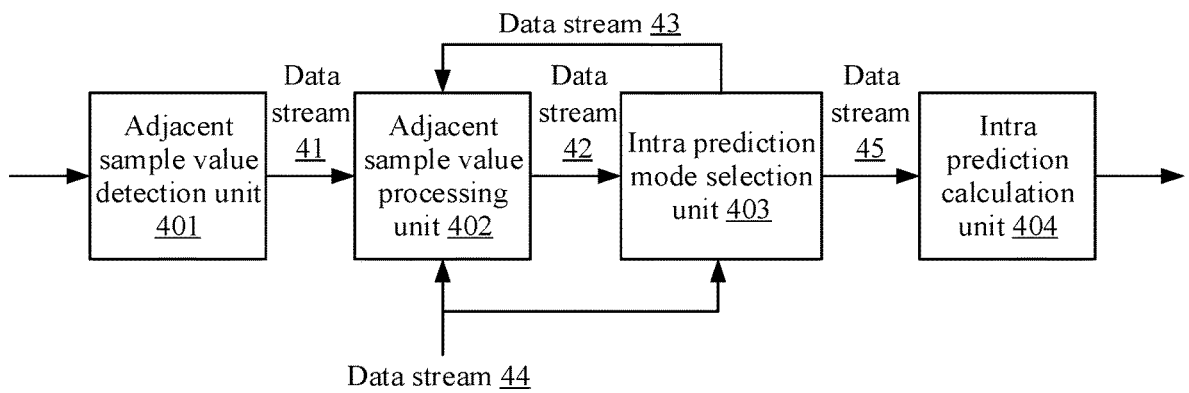
FIG. 7 is a structural diagram of an intra prediction unit in an encoder according to an embodiment of the present disclosure.

Referring to FIG. 7, an embodiment of the present disclosure provides a structural diagram of an intra prediction unit in an encoder. The intra prediction unit 206 includes an adjacent sample value detection unit 401, an adjacent sample value processing unit 402, an intra prediction mode selection unit 403, and an intra prediction calculation unit 404.

It is to be noted that a data stream refers to an entry parameter and a return parameter of a function on a software implementation, data transmitted on a bus and data shared between storage units (including data shared by registers) on a hardware implementation, or the like.

The adjacent sample value detection unit 401 is configured to receive data on a partially restored portion of a current to-be-encoded image and generate information on adjacent sample values of an encoding block.

Optionally, the information on adjacent sample values of the encoding block includes positions of adjacent pixel points where the adjacent sample values are located, whether the adjacent sample values are existent, and values of the adjacent sample values (if the adjacent sample values are existent).

Optionally, the data on the partially restored portion of the current to-be-encoded image includes position information of the encoding block in the image and position information of the encoding block in an image division (such as a slice).

Exemplarily, input data includes a data stream 40 and output data is a data stream 41. The data stream 40 is output data of a second adder 212 before the encoder described above encodes the encoding block and the data on the partially restored portion (not processed by a filtering unit 213 in the encoder described above) of the current to-be-encoded image. The data stream 40 also includes the position information of the encoding block in the image and the position information of the encoding block in the image division (such as the slice), which come from output data of a division unit 201 and a block division unit 203 in the encoder described above. The data stream 41 is output data of the adjacent sample value detection unit 401, is the information on adjacent sample values of the encoding block, and includes the positions of the adjacent pixel points where the adjacent sample values are located, whether the adjacent sample values are existent, and the values of the adjacent sample values (if the adjacent sample values are existent).

The adjacent sample value processing unit 402 is configured to receive the information on adjacent sample values of the encoding block, intra prediction mode indication information, and original values of the encoding block and generate intra prediction reference sample value.

Exemplarily, the input of the adjacent sample value processing unit 402 is the data stream 41, a data stream 43, and a data stream 44, and the output of the adjacent sample value processing unit 402 is a data stream 42. The data stream 41 is the output of the adjacent sample value detection unit 401. The data stream 43 is provided by the intra prediction mode selection unit 403 and includes the intra prediction mode indication information. The data stream 44 is output data of the block division unit 201 in the encoder described above and the original values of the encoding block. The data stream 42 outputted by the adjacent sample value processing unit 402 is the intra prediction reference sample value.

The intra prediction mode selection unit 403 is configured to receive the intra prediction reference sample value and the original values of the encoding block and generate the intra prediction mode indication information.

Exemplarily, the input of the intra prediction mode selection unit 403 is the data stream 42 and the data stream 44, and the output of the intra prediction mode selection unit 403 is a data stream 45. The data stream 42 is output data of the adjacent sample value processing unit 402. The data stream 44 is the output data of the division unit 201 in the encoder described above and is the original values of the encoding block. The data stream 45 is the intra prediction mode indication information (i.e., a mode index of an intra prediction mode) and indicates the intra prediction mode used for encoding the encoding block, where the intra prediction mode is configured for calculating an intra prediction value of the encoding block. The data stream 45 also includes the intra prediction reference sample value in the data stream 42.

The intra prediction calculation unit 404 is configured to calculate the intra prediction value of the encoding block according to the intra prediction reference sample value and the intra prediction mode indication information.

The input of the intra prediction calculation unit 404 is the data stream 45 and the output of the intra prediction calculation unit 404 is a data stream 46. The data stream 45 is output data of the intra prediction mode selection unit 403. The data stream 46 is the intra prediction value of the encoding block, which is calculated by the intra prediction calculation unit 404 using the intra prediction reference sample value in the data stream 45 according to the intra prediction mode indicated by the intra prediction mode indication information in the data stream 45.

Optionally, the encoder may not include the intra prediction calculation unit 404. In the process of selecting an optimal encoding mode for the encoding block, the intra prediction mode selection unit 403 traverses part or all of candidate intra prediction modes, calculates the intra prediction value of the encoding block in candidate modes separately, selects an intra prediction mode that can minimize a weighted sum of the encoding distortion and the encoded bits of the encoding block as an optimal intra prediction mode of the encoding block, and outputs information indicating the optimal intra prediction mode and the corresponding intra prediction value, that is, the data stream 45 outputted by the intra prediction mode selection unit 403 includes the information indicating the optimal intra prediction mode and the intra prediction value of the encoding block.

Figure 8:
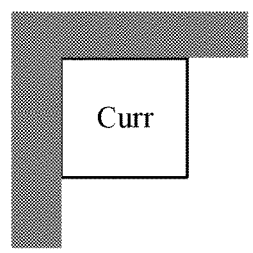
FIG. 8 is a schematic diagram of an intra prediction method according to an embodiment of the present disclosure.

The intra prediction unit 206 may calculate the intra prediction value of the encoding block by intra prediction method 1 and intra prediction method 2. In intra prediction method 1, "Curr" represents the encoding block, and decoded pixel points adjacent to the encoding block are represented in gray. FIG. 8 is a schematic diagram of an intra prediction method according to an embodiment of the present disclosure. FIG. 8 exemplarily shows above adjacent decoded pixel points and left adjacent decoded pixel points of the encoding block. In various different encoding orders, the encoding block may have a right adjacent decoded pixel point or a lower adjacent decoded pixel point. Intra prediction method 1 includes one or more intra prediction modes such as a direct-current prediction mode, a plane prediction mode, and a directional interpolation prediction mode. When intra prediction method 1 is used, the intra prediction mode selection unit 403 in the intra prediction unit 206 outputs a parameter indicating an intra prediction mode used.

Figure 9:
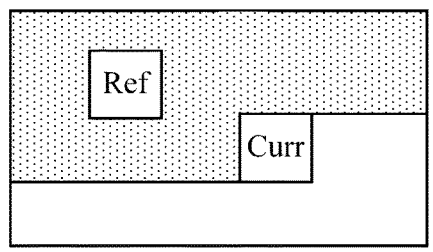
FIG. 9 is a schematic diagram of another intra prediction method according to an embodiment of the present disclosure.

FIG. 9 is a schematic diagram of another intra prediction method according to an embodiment of the present disclosure. In FIG. 9, "Curr" represents the encoding block, a gray region represents the data on the partially restored portion of the image where the encoding block is located before the encoding block is encoded, and "Ref" represents a matching block of the encoding block. When intra prediction method 2 is used, the intra prediction mode selection unit 403 outputs a parameter indicating the construction of the matching block such as a position of the matching block in the image. Intra prediction method 2 may also include one or more intra prediction modes such as a block matching mode and a string matching mode.

Generally, the intra prediction unit 206 uses intra prediction method 1. In an encoder that allows the use of intra prediction method 2, the data stream 45 outputted by the intra prediction mode selection unit 403 in the intra prediction unit 206 also includes intra prediction method indication information for indicating whether to use intra prediction method 1 or intra prediction method 2 to calculate the intra prediction value of the encoding block.

The adjacent sample value detection unit 401 determines the position of the encoding block in the image according to the position information of the encoding block in the data stream 40. For intra prediction method 1, the adjacent sample value detection unit 401 determines whether pixel sample values, which are at the positions of pixel points adjacent to the encoding block, in the data on the partially restored portion of the image in the data stream 40, are existent. The adjacent sample value detection unit 401 uses a determination method described below. The adjacent sample value detection unit 401 includes information on adjacent sample values and related to intra prediction method 1 into the data stream 41.

When a pixel at the position of a reference pixel point of the encoding block has not been encoded, the corresponding adjacent sample value is non-existent.

When the encoding block is located at the boundary of the image, no adjacent sample value is existent at the position of a reference pixel point outside the boundary of the image. For example, when the encoding block is located at the upper boundary of the image, an above adjacent sample value of the encoding block is non-existent.

An adjacent sample value located in a slice different from the slice where the encoding block is located is non-existent.

An adjacent sample value located in a tile different from the tile where the encoding block is located is non-existent.

In the case where intra prediction is limited, an adjacent sample value located in an encoding block for non-intra prediction encoding is non-existent.

Optionally, when the encoder allows the use of intra prediction method 2, the adjacent sample value detection unit 401 determines a range in which all sample values in "Ref" are existent in FIG. 9. When "Ref" is within the range, all the sample values in "Ref" are existent; otherwise, part or all of the sample values in "Ref" are non-existent. The adjacent sample value detection unit 401 determines the range in which all the sample values in "Ref" are existent by the same determination method as that in intra prediction method 1. The adjacent sample value detection unit 401 includes information on adjacent sample values and related to intra prediction method 2 into the data stream 41.

The adjacent sample value processing unit 402 processes data in the data stream 41. For data related to intra prediction method 1, when all the adjacent sample values in the data stream 41 are existent, the adjacent sample value processing unit 402 optionally filters the adjacent sample values in the data stream 41.

Optionally, a filtering method is that the adjacent sample value processing unit 402 may determine whether to filter the adjacent sample values by an existing RDO method and generate flag information for indicating whether to filter the adjacent sample values.

Optionally, in order to reduce the computational complexity of the adjacent sample value processing unit 402, one method is to determine whether to perform filtering for a block of a particular size. Exemplarily, when a size of the encoding block is equal to a preset value or one of multiple preset values, the adjacent sample value processing unit 402 determines whether to filter the adjacent sample values of the encoding block by the existing RDO method and generates the flag information for indicating whether to filter the adjacent sample values. Optionally, in order to reduce the computational complexity of the adjacent sample value processing unit 402, one method is that when the size of the encoding block is equal to the preset value or one of the multiple preset values, the adjacent sample value processing unit 402 filters the adjacent sample values of the encoding block.

Optionally, in order to reduce the computational complexity of the adjacent sample value processing unit 402, one method is to determine whether to perform filtering for a particular intra prediction mode. Exemplarily, when the intra prediction mode in the data stream 43 is a preset mode or one of multiple preset modes, the adjacent sample value processing unit 402 determines whether to filter the adjacent sample values of the encoding block by the existing RDO method and generates the flag information for indicating whether to filter the adjacent sample values. Optionally, in order to reduce the computational complexity of the adjacent sample value processing unit 402, one method is that when the intra prediction mode in the data stream 43 is the preset mode or one of the multiple preset modes, the adjacent sample value processing unit 402 filters the adjacent sample values of the encoding block.

Optionally, in order to reduce the computational complexity of the adjacent sample value processing unit 402, one method is to determine whether to perform filtering for the block of the particular size and the particular intra prediction mode. Exemplarily, when the size of the encoding block is equal to the preset value or one of the multiple preset values and the intra prediction mode in the data stream 43 is the preset mode or one of the multiple preset modes, the adjacent sample value processing unit 402 determines whether to filter the adjacent sample values of the encoding block by the existing RDO method and generates the flag information for indicating whether to filter the adjacent sample values. Optionally, in order to reduce the computational complexity of the adjacent sample value processing unit 402, one method is that when the size of the encoding block is equal to the preset value or one of the multiple preset values and the intra prediction mode in the data stream 43 is the preset mode or one of the multiple preset modes, the adjacent sample value processing unit 402 filters the adjacent sample values of the encoding block. The adjacent sample value processing unit 402 includes the adjacent sample values of the encoding block into the data stream 42.

For the data related to intra prediction method 1, when part or all of the adjacent sample values in the data stream 41 are non-existent, the adjacent sample value processing unit 402 determines a first reference sample value. The input data for the adjacent sample value processing unit 402 to determine the first reference sample value includes an adjacent sample value in the data stream 41 (if part of the adjacent sample values are existent), the position of an adjacent pixel point corresponding to the adjacent sample value, a candidate intra prediction mode in the data stream 43, and the original values of the encoding block in the data stream 44. The adjacent sample value processing unit 402 calculates the first reference sample value by the method of constrained optimization 1 or unconstrained optimization 1 in the embodiment described above. It is to be noted that in the method of constrained optimization 1 or unconstrained optimization 1, one or more first reference sample values may be used. In the case where multiple first reference sample values are used, the adjacent sample value processing unit 402 needs to record a usage manner parameter of different first reference sample values, where the parameter is configured for indicating a manner of using the different first reference sample value to set the adjacent sample value. The adjacent sample value processing unit 402 sets the value of a non-existent adjacent sample value to the value of the first reference sample value and configures all adjacent sample values in the inputted data stream 41 to be "existent" or "available". Optionally, the adjacent sample value processing unit 402 may filter the adjacent sample values by the preceding filtering method. The adjacent sample value processing unit 402 includes data that is filtered or not filtered into the data stream 42.

To reduce the computational complexity, the adjacent sample value processing unit 402 may determine the first reference sample value by a simplified method. One method is that if the data stream 41 indicates that all of the adjacent sample values of the encoding block are non-existent, the adjacent sample value processing unit 402 sets the first reference sample value to an average value of the original values of the encoding block in the data stream 44. One method is that if information on the intra prediction mode in the data stream 43 indicates the DC mode, the adjacent sample value processing unit 402 sets the value of the first pre-reference value to a difference value between the average value of the original values of the encoding block in the data stream 44 and an average value of part of existent adjacent sample values (if present) in the data stream 41. One method is that the adjacent sample value processing unit 402 sets the value of the first pre-reference value to the difference value between the average value of the original values of the encoding block in the data stream 44 and the average value of part of existent adjacent sample values (if present) in the data stream 41.

The intra prediction mode selection unit 403 determines the intra prediction mode for the encoding block. The intra prediction mode selection unit 403 may determine the intra prediction mode of the encoding block by the existing RDO method. In terms of an implementation method, the intra prediction mode selection unit 403 and the adjacent sample value processing unit 402 may determine the intra prediction mode and the first reference sample value together by a joint optimization method. For example, the intra prediction mode selection unit 403 transmits a candidate intra prediction mode to the adjacent sample value processing unit 402 through the data stream 43; the adjacent sample value processing unit 402 determines the first reference sample value in the candidate intra prediction mode, sets the adjacent sample values by using the first reference sample value, and transmits the processed adjacent sample values to the intra prediction mode selection unit 403 through the data stream 42; and the intra prediction mode selection unit 403 calculates a cost function value of the candidate intra prediction mode by using the adjacent sample values in the data stream 42. In the above joint optimization process, if the adjacent sample value processing unit 402 determines the first reference sample value by the method of constrained optimization 1 or unconstrained optimization 1, the adjacent sample value processing unit 402 determines the cost function value of the candidate intra prediction mode at the same time. In this case, the adjacent sample value processing unit 402 further transmits the cost function value to the intra prediction mode selection unit 403 through the data stream 42. The intra prediction mode selection unit 403 compares cost function values of the candidate intra prediction modes and selects a candidate intra prediction mode with a minimum cost function value as the intra prediction mode of the encoding block.

For data related to intra prediction method 2, the adjacent sample value processing unit 402 determines the first reference sample value by a method similar to that for intra prediction method 1 described above. A difference is that when intra prediction method 2 is allowed to be used, the intra prediction mode selection unit 403 includes the position of "Ref" in the image in FIG. 9 in the data stream 43. When the adjacent sample value processing unit 402 determines that not all sample values in "Ref" are within the range, in which all the sample values in "Ref" are existent, indicated in the data stream 41, the adjacent sample value processing unit 402 may determine the first reference sample value by the method of constrained optimization 1 or unconstrained optimization 1 and sets a non-existent sample value in "Ref" to the first reference sample value. Similar to the method for intra prediction method 1 described above, in the method of constrained optimization 1 or unconstrained optimization 1, the number of first reference sample values used may be one or more. In the case where multiple first reference sample values are used, the adjacent sample value processing unit 402 needs to record the usage manner parameter of different first reference sample values, where the parameter is configured for indicating the manner of using the different first reference sample values to set the adjacent sample value.

Similar to the method for intra prediction method 1 described above, for the data related to intra prediction method 2, the adjacent sample value processing unit 402 may determine the first reference sample value by a simplified method to reduce the computational complexity. For example, one method is that the adjacent sample value processing unit 402 sets the first reference sample value to the difference value between the average value of the original values of the encoding block in the data stream 44 and an average value of part of existent adjacent sample values (if present) in the data stream 41. Specifically, if the data stream 41 indicates that none of the adjacent sample values of the encoding block is existent, the adjacent sample value processing unit 402 sets the first reference sample value to the average value of the original values of the encoding block in the data stream 44.

Similar to the method for intra prediction method 1 described above, for the data related to intra prediction method 2, the intra prediction mode selection unit 403 determines the position of "Ref" for the encoding block. The intra prediction mode selection unit 403 may determine the position of "Ref" of the encoding block by the existing RDO method. In terms of an implementation method, the intra prediction mode selection unit 403 and the adjacent sample value processing unit 402 may determine the position of "Ref" and the first reference sample value together by a joint optimization method. For example, the intra prediction mode selection unit 403 transmits a candidate position of "Ref" to the adjacent sample value processing unit 402 through the data stream 43; the adjacent sample value processing unit 402 determines the first reference sample value of the candidate position of "Ref", sets the sample values in "Ref" by using the first reference sample value, and transmits the processed sample values in "Ref" to the intra prediction mode selection unit 403 through the data stream 42; and the intra prediction mode selection unit 403 calculates a cost function value of the candidate position of "Ref" by using the sample values in "Ref" in the data stream 42. In the above joint optimization process, if the adjacent sample value processing unit 402 determines the first reference sample value by the method of constrained optimization 1 or unconstrained optimization 1, the adjacent sample value processing unit 402 determines the cost function value of the candidate position of "Ref" at the same time. In this case, the adjacent sample value processing unit 402 further transmits the cost function value to the intra prediction mode selection unit 403 through the data stream 42. The intra prediction mode selection unit 403 compares cost function values of candidate positions of "Ref", selects the position of the candidate "Ref" with the minimum cost function value as the position of "Ref" of the encoding block, and outputs a parameter configured for indicating the position of "Ref" through the data stream 45, where the parameter is expressed as an offset between the positions of the encoding block and "Ref" in a same image coordinate system.

It is to be noted that optionally, when part or all of the adjacent sample values in the data stream 41 are non-existent, the adjacent sample value processing unit 402 may set a non-existent adjacent sample value or a non-existent sample value in "Ref" to a default value (such as "1<< (BitDepth−1)" in the portion for describing the background). The above joint optimization method of the adjacent sample value processing unit 402 and the intra prediction mode selection unit 403 uses the default value as one candidate first reference sample value described above. When the default value is used, the adjacent sample value processing unit 402 adds a flag bit for indicating the use of the default value in the data stream 42.

Embodiment Eight

Figure 10:
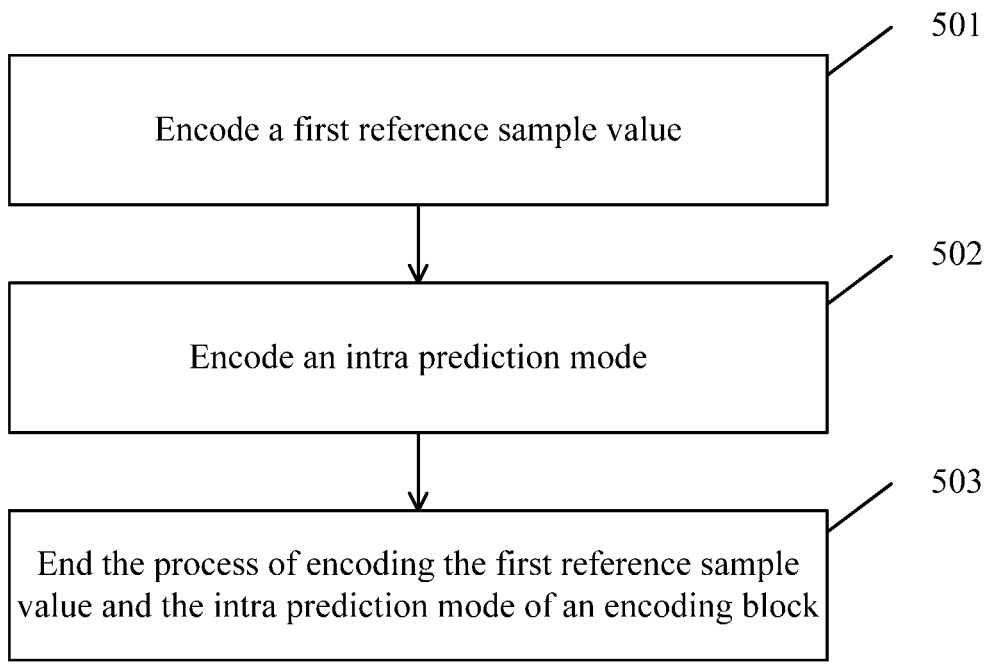
FIG. 10 is a flowchart of data processing in which an entropy encoding unit of an encoder encodes an output parameter of an intra prediction unit according to an embodiment of the present disclosure.

FIG. 10 is a flowchart of data processing in which an entropy encoding unit encodes an output parameter of an intra prediction unit in an encoder according to an embodiment of the present disclosure. The input of the processing flow is the output parameter of the intra prediction unit 206, and the output of the processing flow is a bitstream corresponding to an intra prediction mode and a first reference sample value.

In step 501, the first reference sample value is encoded.

Optionally, the first reference sample value may include a sample value control parameter in addition to a sample value, where the sample value control parameter indicates whether to use the first reference sample value or a default value to determine a non-existent adjacent sample value in the process of encoding an encoding block by using the intra prediction mode. The sample value control parameter includes at least one of the following control parameters: a sequence layer sample value control parameter, an image layer sample value control parameter, a slice layer sample value control parameter, or a block layer sample value control parameter.

The sequence layer sample value control parameter is configured for indicating whether to use the first reference sample value to determine the non-existent adjacent sample value in the process of encoding the encoding block by using the intra prediction mode for images in an entire video. When the value of the sequence layer sample value control parameter indicates "Yes", the intra prediction unit 206 determines the first reference sample value of the encoding block in the case where part or all of adjacent sample values of the encoding block are non-existent; otherwise, when the value of the sequence layer sample value control parameter indicates "No", the intra prediction unit 206 sets the non-existent adjacent sample value to the default value. The entropy encoding unit 215 encodes the sequence layer sample value control parameter that is in a parameter set and whose valid range may be the entire video. Optionally, when the value of the sequence layer sample value control parameter indicates "Yes", the entropy encoding unit 215 may encode a sample value of the first reference sample value that is in the parameter set and whose valid range may be the entire video, where the sample value may be configured for encoding blocks that use the intra prediction mode in the entire video.

The image layer sample value control parameter is configured for indicating whether to use the first reference sample value to determine the non-existent adjacent sample value in the process of encoding the encoding block by using the intra prediction mode for an image. When the value of the image layer sample value control parameter indicates "Yes", the intra prediction unit 206 determines the first reference sample value of the encoding block in the case where part or all of the adjacent sample values of the encoding block are non-existent; otherwise, when the value of the image layer sample value control parameter indicates "No", the intra prediction unit 206 sets the non-existent adjacent sample value to the default value. The entropy encoding unit 215 encodes the image layer sample value control parameter that is in a parameter set and whose valid range may be an image. Optionally, when the value of the image layer sample value control parameter indicates "Yes", the entropy encoding unit 215 may encode a sample value of the first reference sample value that is in a parameter set and whose valid range may be an image, where the sample value may be set to an encoding block that use the intra prediction mode in the image.

The slice layer sample value control parameter is used for indicating whether to use the first reference sample value to determine the non-existent adjacent sample value in the process of encoding the encoding block by using the intra prediction mode for one slice. When the value of the slice layer sample value control parameter indicates "Yes", the intra prediction unit 206 determines the first reference sample value of the encoding block in the case where part or all of the adjacent sample values of the encoding block are non-existent; otherwise, when the value of the image layer sample value control parameter indicates "No", the intra prediction unit 206 sets the non-existent adjacent sample value to the default value. The entropy encoding unit 215 encodes the slice layer sample value control parameter in a slice header. Optionally, when the value of the slice layer sample value control parameter indicates "Yes", the entropy encoding unit 215 may encode a sample value of the first reference sample value in the slice header, where the sample value may be set to an encoding block that use the intra prediction mode in a slice.

The block layer sample value control parameter is configured for indicating whether to use the first reference sample value to determine the non-existent adjacent sample value in the process of encoding the encoding block by using the intra prediction mode for an encoding block. When the value of the block layer sample value control parameter indicates "Yes", the intra prediction unit 206 determines the first reference sample value of the encoding block in the case where part or all of the adjacent sample values of the encoding block are non-existent; otherwise, when the value of the block layer sample value control parameter indicates "No", the intra prediction unit 206 sets the non-existent adjacent sample value to the default value. The entropy encoding unit 215 encodes the block layer sample value control parameter in a data unit of the encoding block. Optionally, when the value of the block layer sample value control parameter indicates "Yes", the entropy encoding unit 215 may encode a sample value of the first reference sample value in the data unit of the encoding block, where the sample value may be set to the encoding block or a division of the decoding block that uses the intra prediction mode in the data unit.

Optionally, the encoder may set a valid range for the block layer sample value control parameter and the corresponding first reference sample value to a slice. An implementation method is that when the encoder constructs the adjacent sample value of an encoding block in the slice by using the intra prediction mode and the first reference sample value for the first time, the entropy encoding unit 215 encodes the block layer sample value control parameter and the first reference sample value in a data unit of the encoding block. The encoder uses the same block layer sample value control parameter and the same first reference sample value for subsequent encoding blocks in the slice that use the intra prediction mode, and the entropy encoding unit 215 no longer encodes the block layer sample value control parameter and the first reference sample value for these encoding blocks.

Optionally, the encoder may set the valid range for the block layer sample value control parameter and the corresponding first reference sample value to a slice. An implementation method is that when the encoder constructs the adjacent sample value of an encoding block in the slice by using the intra prediction mode and the first reference sample value for the first time, the entropy encoding unit 215 encodes the block layer sample value control parameter (denoted as a "control parameter 1") and the first reference sample value (denoted as a "sample value 1") in the data unit of the encoding block. If the encoder uses the control parameter 1 and the sample value 1 in the encoding process of a subsequent encoding block that uses the intra prediction mode in the slice, the entropy encoding unit 215 no longer encodes the block layer sample value control parameter and the first reference sample value of the encoding block. If the encoder uses block layer sample value control parameters (denoted as a "control parameter 2" and a "sample value 2") different from the control parameter 1 and the sample value 1 in the encoding process of a subsequent encoding block in the slice that uses the intra prediction mode, the entropy encoding unit 215 encodes the "control parameter 2" and the "sample value 2" in a data unit of the encoding block.

Specially, if the encoder configures an adjacent sample value processing unit 402 in FIG. 7 to determine whether to use the first reference sample value to construct intra prediction adjacent sample values of an encoding block according to a size of the encoding block, the entropy encoding unit 215 does not encode the block layer sample value control parameter and the first reference sample value for an encoding block whose block size meets an "not used" condition; when the encoder configures an encoding block whose block size meets a "usable" condition to be "certainly used", the entropy encoding unit 215 encodes only the first reference sample value rather than the block layer sample value control parameter for an encoding block whose block size meets a "certainly used" condition.

Specially, if the encoder configures the adjacent sample value processing unit 402 in FIG. 7 to determine whether to use the first reference sample value to construct intra prediction adjacent sample values of an encoding block according to an intra prediction mode of the encoding block, the entropy encoding unit 215 does not encode the block layer sample value control parameter and the first reference sample value of an encoding block whose intra prediction mode meets an "not used" condition; when the encoder configures an encoding block whose intra prediction mode meets a "usable" condition to be "certainly used", the entropy encoding unit 215 encodes only the first reference sample value rather than the block layer sample value control parameter for an encoding block whose intra prediction mode meets a "certainly used" condition.

Specially, the encoder may combine the above two special cases for use.

It is to be noted that the entropy encoding unit 215 performs step 501 to encode the block layer sample value control parameter. If the encoder uses one or more of the sequence layer sample value control parameter, the image layer sample value control parameter, or the slice layer sample value control parameter, the entropy encoding unit 215 needs to encode the sequence layer sample value control parameter or the image layer sample value control parameter in the process of generating the corresponding parameter set, or the entropy encoding unit 215 needs to encode the slice layer sample value control parameter in the process of encoding the slice header and may also encode in block layer a block layer sample value control parameter configured to be controlled by a slice layer through the above optional method. The encoder may set the sequence layer/image layer/slice layer sample value control parameter according to a configuration file or dynamically determine the value of the control parameter by the RDO method. The configuration file records a parameter setting configured for initializing the encoder.

It is to be noted that in terms of a valid control range of the control parameter, the range of a sequence layer is larger than that of an image layer, the range of the image layer is larger than that of the slice layer, and the range of the slice layer is larger than that of a block layer. Generally, a control mechanism of the control parameter is that when a control parameter with a larger control range indicates "usable", a control parameter with a smaller control range is encoded and configured for indicating "usable or not" within the smaller control range. Specially, for a block layer filter control parameter, if one encoding block is divided into multiple sub-blocks, the control range of the block layer filter control parameter of this encoding block is larger than that of the sub-block, that is, when the block layer sample value control parameter of this encoding block indicates "not used", the sub-block does not use the first reference sample value to determine intra prediction reference sample value, and the entropy encoding unit 215 does not need to encode the block layer sample value control parameter of the sub-block.

It is to be noted that when the control parameter indicates "usable", the entropy encoding unit 215 may encode or derive the first reference sample value correspondingly for the control parameter. Generally, the first reference sample value corresponding to the control parameter with a smaller valid control range covers the first reference sample value corresponding to the control parameter with a larger control range. For example, if the entropy encoding unit 215 encodes the first reference sample value of the encoding block, the encoding block uses the first reference sample value at the block layer rather than the first reference sample value at the slice layer in the process of constructing adjacent sample values for the intra prediction mode.

In step 502, the intra prediction mode is encoded. The entropy encoding unit 215 encodes the intra prediction mode of the encoding block.

In case 1, the intra prediction unit 206 in the encoder uses merely intra prediction method 1 shown in FIG. 8.

The entropy encoding unit 215 derives one or more intra prediction modes that are most likely to be used by the encoding block according to an intra prediction mode of an encoded block adjacent to the encoding block.

If the intra prediction mode used by the encoding block is one of the intra prediction modes that are most likely to be used, the entropy encoding unit 215 encodes a flag bit, where the value of the flag bit is configured for indicating that "the intra prediction mode used by the encoding block is a mode among the intra prediction modes that are most likely to be used". If the intra prediction modes that are most likely to be used include more than one mode, the entropy encoding unit 215 encodes an index of the intra prediction mode used by the encoding block among the intra prediction modes that are most likely to be used.

If the intra prediction mode used by the encoding block is not one of the intra prediction modes that are most likely to be used, an index of the intra prediction mode used by the encoding block among intra prediction modes other than the intra prediction modes that are most likely to be used is encoded.

In case 2, the intra prediction unit 206 in the encoder uses intra prediction method 1 in FIG. 8 and intra prediction method 2 in FIG. 9.

Identification information for indicating whether the intra prediction mode of the encoding block belongs to intra prediction method 1 or intra prediction method 2 is encoded. An optional method is that the entropy encoding unit 215 encodes a flag bit to indicate the above information. An optional method is that an intra prediction flag of the encoding block is merely used for indicating that the encoding block uses the intra prediction mode in intra prediction method 1. When the encoding block uses intra prediction method 2, the entropy encoding unit 215 encodes the intra prediction flag of the encoding block as "No" and encodes an index of a reference image of the encoding block as a value indicating that "the reference image used by the encoding block is the image where the encoding block is located". Optionally, the entropy encoding unit 215 may further encode a field related to intra prediction method 2 for indicating the intra prediction mode used by the encoding block. Intra prediction method 2 may include intra prediction modes such as a block matching mode and a string matching mode. The entropy encoding unit 215 continues to encode related parameters for determining a matching block and a matching string, and the parameters are used for determining the positions of the matching block and the matching string in the image where the encoding block is located.

In step 503, the entropy encoding unit 215 writes encoded bits generated in the encoding process into the outputted bitstream.

Embodiment Nine

Figure 11:
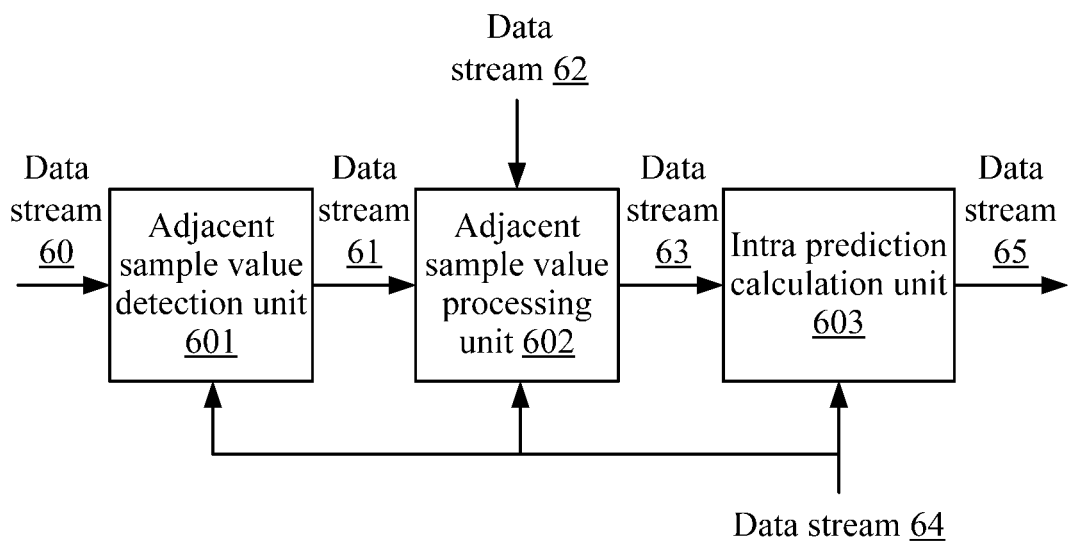
FIG. 11 is a structural diagram of an intra prediction unit of a decoder according to an embodiment of the present disclosure.

FIG. 11 is a structural diagram of an intra prediction unit in a decoder according to an embodiment of the present disclosure. The intra prediction unit 304 includes an adjacent sample value detection unit 601, an adjacent sample value processing unit 602, and an intra prediction calculation unit 603.

Input data of the adjacent sample value detection unit 601 is data on a partially restored portion of a current to-be-decoded image and intra prediction mode indication information of a decoding block; output data of the adjacent sample value detection unit 601 is information on adjacent sample values of the decoding block.

Exemplarily, the input data of the adjacent sample value detection unit 601 is a data stream 60 and a data stream 64, and its output data is a data stream 61. The data stream 60 is output data of the adder 307 before the decoder described above decodes the decoding block and is the data on the partially restored portion (not processed by a filtering unit 308 in the decoder described above) of the current to-be-decoded image. The data stream 60 also includes position information of the decoding block in the image and position information of the decoding block in an image division (such as a slice), where the position information comes from output data of a parsing unit 301 in the decoder described above. The data stream 64 is the intra prediction mode indication information of the decoding block outputted by the parsing unit 301 and configured for indicating an intra prediction mode used by the decoding block. The data stream 61 is the output data of the adjacent sample value detection unit 601 and the information on adjacent sample values of the decoding block, which includes the positions of the adjacent pixel points where the adjacent sample values are located, whether the adjacent sample values are existent, and the values of the adjacent sample values (if the adjacent sample values are existent). The data stream 61 also includes a size of the decoding block.

The input of the adjacent sample value processing unit 602 is the information on adjacent sample values of the decoding block and a first reference sample value, and its output is intra prediction reference sample value.

Exemplarily, the input of the adjacent sample value processing unit 602 is the data stream 61, a data stream 62 and the data stream 64, and its output is a data stream 63. The data stream 61 is the output of the adjacent sample value detection unit 601. The data stream 62 is the first reference sample value outputted by the parsing unit 301 and including the values of a sample value control parameter and the first reference sample value. Optionally, the decoder inputs the data stream 64 to the adjacent sample value processing unit 602. The data stream 64 is the intra prediction mode indication information of the decoding block outputted by the parsing unit 301 and configured for indicating the intra prediction mode used by the decoding block. The data stream 63 outputted by the adjacent sample value processing unit 602 is the intra prediction reference sample value.

The input of the intra prediction calculation unit 603 is the intra prediction reference sample value and the data stream 64, and its output is an intra prediction value of the decoding block.

Exemplarily, the input of the intra prediction calculation unit 603 is the data stream 63 and the intra prediction mode indication information of the decoding block, and the output of the intra prediction calculation unit 603 is a data stream 65. The data stream 63 is output data of the adjacent sample value processing unit 602. The data stream 64 is the intra prediction mode indication information of the decoding block outputted by the parsing unit 301 and configured for indicating the intra prediction mode used by the decoding block. The intra prediction calculation unit 603 calculates the intra prediction value of the decoding block as the outputted data stream 65 by using the intra prediction reference sample value in the data stream 63 according to the intra prediction mode indicated by the intra prediction mode indication information in the data stream 64.

Similar to an intra prediction unit 206 in the encoder described above, the intra prediction unit 304 in the decoder described above may calculate the intra prediction value of the decoding block by intra prediction method 1 shown in FIG. 8 or intra prediction method 2 shown in FIG. 9 and output the data stream 65. In intra prediction method 1 shown in FIG. 8, "Curr" represents a decoding block, and decoded pixel points adjacent to the decoding block are represented in gray. FIG. 8 exemplarily shows above adjacent decoded pixel points and left adjacent decoded pixel points of the decoding block. In various different decoding orders, the decoding block may have a right adjacent decoded pixel point or a lower adjacent decoded pixel point. Intra prediction method 1 includes one or more intra prediction modes such as a direct current prediction mode, a plane prediction mode, and a directional interpolation prediction mode. When intra prediction method 1 is used, the data stream 64 inputted by the decoder to the intra prediction calculation unit 603 is an index of the intra prediction mode, and the outputted data stream 65 is the intra prediction value of the decoding block obtained by using the intra prediction mode indicated in the data stream 64.

In intra prediction method 2 shown in FIG. 9, "Curr" represents the decoding block, a gray region represents the data on the partially restored portion of the image where the decoding block is located before the decoding block is decoded, and "Ref" represents a matching block of the decoding block. When intra prediction method 2 is used, the data stream 64 inputted by the decoder to the intra prediction calculation unit 603 is configured for indicating the position information of "Ref" such as an offset between the positions of "Curr" and "Ref" in the same image coordinate system, and the outputted data stream 65 is the intra prediction value of the decoding block constructed by using "Ref" obtained with the position information of "Ref" indicated in the data stream 64, for example, the intra prediction value of the decoding block is set to a sample value in "Ref" or a value obtained by filtering sample values in "Ref". Intra prediction method 2 may also include one or more intra prediction modes such as a block matching mode and a string matching mode.

Generally, the intra prediction unit 304 uses intra prediction method 1. In a decoder that allows the use of intra prediction method 2, the data stream 64 includes intra prediction method indication information for determining whether to use intra prediction method 1 or intra prediction method 2 to calculate a first prediction value of the decoding block in the process of decoding the decoding block.

The adjacent sample value detection unit 601 determines the position of the decoding block in the image according to the position information of the decoding block in the data stream 60. When the intra prediction mode indication information in the data stream 64 indicates that the decoder uses intra prediction method 1, the adjacent sample value detection unit 601 determines whether pixel sample values at the positions of pixel points adjacent to the decoding block, in the data on the partially restored portion of the image in the data stream 60, are existent. The adjacent sample value detection unit 601 uses a determination method described below. The adjacent sample value detection unit 601 includes information on adjacent sample values and related to intra prediction method 1 into the data stream 61. The data stream 61 also includes the size of the decoding block.

When a pixel at the position of a reference pixel point for the decoding block has not been decoded, the corresponding adjacent sample value is non-existent.

When the decoding block is located at the boundary of the image, no adjacent sample value is existent at the position of a reference pixel point outside the boundary of the image. For example, when the decoding block is located at the upper boundary of the image, an above adjacent sample value of the decoding block is non-existent.

An adjacent sample value located in a slice different from the slice where the decoding block is located is non-existent.

An adjacent sample value located in a tile different from the tile where the decoding block is located is non-existent.

In the case where intra prediction is limited, an adjacent sample value located in a decoding block for non-intra prediction decoding is non-existent.

When the intra prediction mode indication information in the data stream 64 indicates that the decoder uses intra prediction method 2, the adjacent sample value detection unit 601 determines whether all sample values in "Ref" in FIG. 9 are existent. The adjacent sample value detection unit 601 determines the position of "Ref" in the image according to the position information of "Ref" in the data stream 64 and the position of the decoding block in the image. The adjacent sample value detection unit 601 determines the range in which all the sample values in "Ref" are existent by the same determination method as that in intra prediction method 1. The adjacent sample value detection unit 601 includes information on adjacent sample values and related to intra prediction method 2 into the data stream 61. The data stream 61 also includes the size of the decoding block.

The adjacent sample value processing unit 602 processes data in the data stream 61. When the intra prediction mode indication information in the data stream 64 indicates that the decoder uses intra prediction method 1 and all the adjacent sample values in the data stream 61 are existent, the adjacent sample value processing unit 602 filters the adjacent sample values in the data stream 61 according to the indication information in the data stream 64.

Optionally, one method is that the adjacent sample value processing unit 602 determines whether to filter the adjacent sample values according to flag information included in the data stream 64.

Optionally, one method is to perform filtering for merely a block of a particular size. Exemplarily, when the size of the decoding block in the data stream 61 is equal to a preset value or one of multiple preset values, the adjacent sample value processing unit 602 determines whether to filter the adjacent sample values of the decoding block according to the flag information included in the data stream 64. One method is that when the size of the decoding block in the data stream 61 is equal to the preset value or one of the multiple preset values, the adjacent sample value processing unit 602 filters the adjacent sample values of the decoding block.

Optionally, one method is to perform filtering for merely a particular intra prediction mode. Exemplarily, when the intra prediction mode in the data stream 64 is a preset mode or one of multiple preset modes, the adjacent sample value processing unit 602 determines whether to filter the adjacent sample values of the decoding block according to the flag information included in the data stream 64. Optionally, one method is that when the intra prediction mode in the data stream 64 is the preset mode or one of the multiple preset modes, the adjacent sample value processing unit 602 filters the adjacent sample values of the decoding block.

Optionally, one method is to perform filtering for the block of the particular size and the particular intra prediction mode. Exemplarily, when the size of the decoding block in the data stream 61 is equal to the preset value or one of the multiple preset values and the intra prediction mode in the data stream 64 is the preset mode or one of the multiple preset modes, the adjacent sample value processing unit 602 determines whether to filter the adjacent sample values of the decoding block according to the flag information included in the data stream 64. Optionally, one method is that when the size of the decoding block in the data stream 61 is equal to the preset value or one of the multiple preset values and the intra prediction mode in the data stream 64 is the preset mode or one of the multiple preset modes, the adjacent sample value processing unit 602 filters the adjacent sample values of the decoding block. The adjacent sample value processing unit 602 includes the adjacent sample values of the decoding block into the data stream 63.

When the intra prediction mode indication information in the data stream 64 indicates that the decoder uses intra prediction method 1 and part or all of the adjacent sample values in the data stream 61 are non-existent, the adjacent sample value processing unit 602 obtains the first reference sample value including the sample value control parameter and the value of the first reference sample value. When the sample value control parameter indicates that the first reference sample value is used for constructing a non-existent adjacent sample value, the adjacent sample value processing unit 602 sets the value of the non-existent adjacent sample value to the value of the first reference sample value and configures all the adjacent sample values of the decoding block to be "existent" or "available".

Optionally, when multiple first reference sample values are used, the adjacent sample value processing unit 602 sets the value of the non-existent adjacent sample value to the value of the corresponding first reference sample value according to a usage manner parameter of different first reference sample values in the data stream 62 and configures all the adjacent sample values of the decoding block to be "existent" or "available". When the sample value control parameter indicates that the first reference sample value is not used for constructing the non-existent adjacent sample value, the adjacent sample value processing unit 602 sets the non-existent adjacent sample value using a default value (such as "1<<(BitDepth−1)" in the portion for describing the background) and configures all the adjacent sample values of the decoding block to be "existent" or "available".

Optionally, the adjacent sample value processing unit 602 may filter the adjacent sample values by the preceding filtering method. The adjacent sample value processing unit 602 includes the adjacent sample values of the decoding block into the data stream 63.

In the case where the intra prediction mode indication information in the data stream 64 indicates that the decoder uses intra prediction method 2, when the sample value control parameter indicates that the first reference sample value is used for constructing a non-existent sample value in "Ref", the adjacent sample value processing unit 602 sets the value of the non-existent sample value in "Ref" to the value of the first reference sample value.

Optionally, when multiple first reference sample values are used, the adjacent sample value processing unit 602 sets the value of the non-existent sample value in "Ref" to the value of the corresponding first reference sample value according to the usage manner parameter of different first reference sample values in the data stream 62. When the sample value control parameter indicates that the first reference sample value is not used for constructing the non-existent sample value in "Ref", the adjacent sample value processing unit 602 sets the non-existent adjacent sample value using the default value (such as a method for image filling using a sample value at the position of a pixel point at the boundary of the image or the slice) and configures all the adjacent sample values of the decoding block to be "existent" or "available". The adjacent sample value processing unit 602 includes sample values in "Ref" into the data stream 63.

The intra prediction calculation unit 603 calculates the intra prediction value of the decoding block as the outputted data stream 65 by using the intra prediction reference sample value in the data stream 63 according to the intra prediction mode indicated by the intra prediction mode indication information in the data stream 64.

Embodiment Ten

Figure 12:
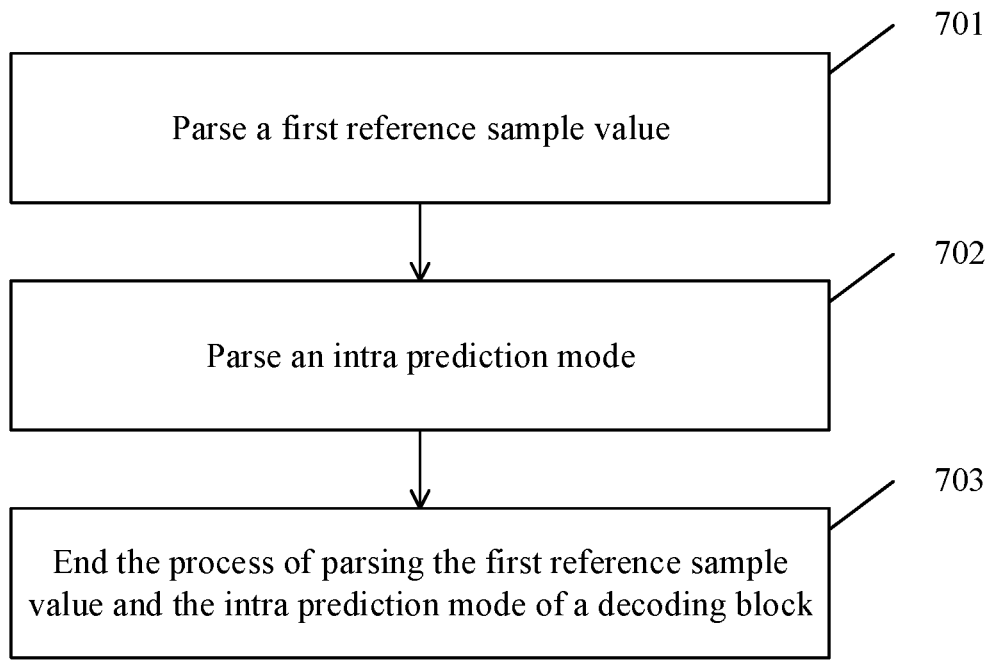
FIG. 12 is a flowchart of data processing in which a parsing unit of a decoder parses an intra prediction mode and a filtering parameter in a bitstream of a decoding block according to an embodiment of the present disclosure.

FIG. 12 is a flowchart of data processing in which a parsing unit in a decoder parses an intra prediction mode and a filtering parameter in a bitstream of a decoding block according to an embodiment of the present disclosure. The input of the processing flow is a bitstream corresponding to a first reference sample value and the intra prediction mode in the inputted bitstream, and the output of the processing flow is the first reference sample value and the intra prediction mode. The decoder described above configures the first reference sample value to be a data stream 62 inputted to an adjacent sample value processing unit 602 in an intra prediction unit 304. The decoder described above configures the intra prediction mode to be a data stream 64 used in the intra prediction unit 304.

In step 701, the first reference sample value is obtained through parsing.

Optionally, the first reference sample value may include a sample value control parameter in addition to a sample value, where the sample value control parameter indicates whether to use the first reference sample value or a default value to determine a non-existent adjacent sample value in the process of decoding the decoding block by using the intra prediction mode. The sample value control parameter includes at least one of a sequence layer sample value control parameter, an image layer sample value control parameter, a slice layer sample value control parameter, or a block layer sample value control parameter.

The sequence layer sample value control parameter is used for indicating whether to use the first reference sample value to determine the non-existent adjacent sample value for images in an entire video in the process of decoding the decoding block by using the intra prediction mode. When the value of the sequence layer sample value control parameter indicates "Yes", the intra prediction unit 304 sets the adjacent sample value of the decoding block using the first reference sample value in the case where part or all of adjacent sample values of the decoding block are non-existent; otherwise, when the value of the sequence layer sample value control parameter indicates "No", the intra prediction unit 304 sets the non-existent adjacent sample value using the default value. The parsing unit 301 obtains the sequence layer sample value control parameter that is in a parameter set and whose valid range may be the entire video. Optionally, when the value of the sequence layer sample value control parameter indicates "Yes", the parsing unit 301 may obtain a sample value of the first reference sample value that is in the parameter set and whose the valid range may be the entire video, where the sample value may be used for decoding blocks that use the intra prediction mode in the entire video.

The image layer sample value control parameter is used for indicating whether to use the first reference sample value to determine the non-existent adjacent sample value in the process of decoding the decoding block by using the intra prediction mode for one image. When the value of the image layer sample value control parameter indicates "Yes", the intra prediction unit 304 sets the adjacent sample value of the decoding block using the first reference sample value in the case where part or all of the adjacent sample values of the decoding block are non-existent; otherwise, when the value of the image layer sample value control parameter indicates "No", the intra prediction unit 304 sets the adjacent sample value of the decoding block using the default value. The parsing unit 301 obtains the image layer sample value control parameter that is in a parameter set and whose valid range may be an image. Optionally, when the value of the image layer sample value control parameter indicates "Yes", the parsing unit 301 may obtain a sample value of the first reference sample value that is the parameter set and whose valid range may be an image, where the sample value may be used for decoding blocks that use the intra prediction mode in the image.

The slice layer sample value control parameter is used for indicating whether to use the first reference sample value to determine the non-existent adjacent sample value in the process of decoding the decoding block by using the intra prediction mode for one slice. When the value of the slice layer sample value control parameter indicates "Yes", the intra prediction unit 304 sets the adjacent sample value using the first reference sample value of the decoding block in the case where part or all of the adjacent sample values of the decoding block are non-existent; otherwise, when the value of the slice layer sample value control parameter indicates "No", the intra prediction unit 304 sets the adjacent sample value of the decoding block using the default value. The parsing unit 301 obtains the slice layer sample value control parameter in a slice header. Optionally, when the value of the slice layer sample value control parameter indicates "Yes", the parsing unit 301 may obtain a sample value of the first reference sample value in a slice header, where the sample value may be used for decoding blocks that use the intra prediction mode in the slice.

The block layer sample value control parameter is used for indicating whether to use the first reference sample value to determine the non-existent adjacent sample value in the process of decoding the decoding block by using the intra prediction mode for one decoding block. When the value of the block layer sample value control parameter indicates "Yes", the intra prediction unit 304 sets the adjacent sample value of the decoding block using the first reference sample value in the case where part or all of the adjacent sample values of the decoding block are non-existent; otherwise, when the value of the block layer sample value control parameter indicates "No", the intra prediction unit 304 sets the adjacent sample value of the decoding block using the default value. The parsing unit 301 obtains the block layer sample value control parameter in a data unit of the decoding block. Optionally, when the value of the block layer sample value control parameter indicates "Yes", the parsing unit 301 may obtain a sample value of the first reference sample value in the data unit of the decoding block, where the sample value may be used for a decoding block that uses the intra prediction mode in the data unit of a decoding block or a division of the decoding block.

Optionally, the decoder may set the valid range for the block layer sample value control parameter and the corresponding first reference sample value to one slice. An implementation method is that for a first decoding block in a slice that uses the intra prediction mode and the first reference sample value to construct the adjacent sample values of the decoding block, the parsing unit 301 obtains the block layer sample value control parameter and the first reference sample value in a data unit of the decoding block. The decoder uses the same block layer sample value control parameter and the same first reference sample value of a subsequent decoding block that uses the intra prediction mode in the slice.

Optionally, the decoder may set the valid range for the block layer sample value control parameter and the corresponding first reference sample value to one slice. An implementation method is that for a first decoding block in a slice that uses the intra prediction mode and the first reference sample value to construct the adjacent sample values of the decoding block, the parsing unit 301 obtains the block layer sample value control parameter (denoted as a "control parameter 1") and the first reference sample value (denoted as a "sample value 1") in a data unit of the decoding block. If a data unit of the subsequent decoding block that uses the intra prediction mode in the slice includes no new first reference sample value, the parsing unit 301 configures the control parameter 1 and the sample value 1 to be the first reference sample value and transmits the control parameter 1 and the sample value 1 as the data stream 62 to the adjacent sample value processing unit 602. If the data unit of the subsequent decoding block that uses the intra prediction mode in the slice includes a new first reference sample value (denoted as a "control parameter 2" and a "sample value 2"), the parsing unit 301 obtains the new first reference sample value and transmits the new first reference sample value as the data stream 62 to the adjacent sample value processing unit 602.

A processing process in which the decoder sets the valid range for the block layer sample value control parameter and the corresponding first reference sample value to the slice may be summarized as follows: the parsing unit 301 always sets the data stream 62 using the first reference sample value obtained for the last time in the decoding blocks included in the slice.

Specifically, referring to FIG. 11, an embodiment of the present disclosure provides an intra prediction unit of a decoder. If the decoder configures the adjacent sample value processing unit 602 in FIG. 11 to determine whether to use the first reference sample value to construct intra prediction adjacent sample values of a decoding block according to the size of the decoding block, the parsing unit 301 may not parse the bitstream of the decoding block and directly configure "No" for the block layer sample value control parameter of a decoding block whose block size meets an "not used" condition; when the decoder configures a decoding block whose block size meets a "usable" condition to be "certainly used", the parsing unit 301 may not necessarily parse the bitstream of the decoding block and directly configure "Yes" for the block layer sample value control parameter of a decoding block whose block size meets a "certainly used" condition. The parsing unit 301 parses the bitstream of the decoding block to obtain the value of the first reference sample value at a block layer. "Configures" here refers to a configuration performed by the decoder for the decoding process according to parameter set indication information or a preset rule.

Specifically, if the decoder configures the adjacent sample value processing unit 602 in FIG. 11 to determine whether to use the first reference sample value to construct intra prediction adjacent sample values of a decoding block according to the intra prediction mode of the decoding block, the parsing unit 301 does not parse the data unit of a decoding block whose intra prediction mode meets an "not used" condition and configured "No" for the block layer sample value control parameter. When the decoder configures a decoding block whose intra prediction mode meets a "usable" condition to be "certainly used", the parsing unit 301 does not parse the data unit of a decoding block whose intra prediction mode meets a "certainly used" condition and configures "Yes" for the block layer sample value control parameter of the decoding block. The parsing unit 301 parses the bitstream of the decoding block to obtain the value of the first reference sample value at a block layer. "Configures" here refers to a configuration performed by the decoder for the decoding process according to the parameter set indication information or the preset rule.

Specially, the decoder may combine the above two special cases for use.

It is to be noted that the parsing unit 301 performs step 701 to decode the block layer sample value control parameter and the value of the first reference sample value. If the parsing unit 301 obtains one or more of the sequence layer sample value control parameter, the image layer sample value control parameter, or the slice layer sample value control parameter by parsing the bitstream, it is to be noted that in terms of a valid control range of the control parameter, the range of a sequence layer is larger than that of an image layer, the range of the image layer is larger than that of a slice layer, and the range of the slice layer is larger than that of the block layer. Generally, a control mechanism of the control parameter is that when a control parameter with a larger control range indicates "usable", a control parameter with a smaller control range is parsed to obtain information for indicating "usable or not" within the smaller control range. Specially, for a block layer filter control parameter, if one decoding block is divided into multiple sub-blocks, the control range of the block layer filter control parameter of this decoding block is larger than that of the sub-block, that is, when the block layer filter control parameter of this decoding block indicates "not used", the sub-block does not use adaptive filtering, and the parsing unit 301 no longer needs to parse a data unit of the sub-block to obtain the block layer filter control parameter of the sub-block.

It is to be noted that when the control parameter indicates "usable", the parsing unit 301 may parse or derive the value of the first reference sample value corresponding to the control parameter.

Generally, the value of the first reference sample value corresponding to the control parameter with a smaller valid control range covers the value of the first reference sample value corresponding to the control parameter with a larger control range. For example, if the parsing unit 301 obtains the first reference sample value at the block layer of the decoding block, the decoder uses the first reference sample value at the block layer rather than the first reference sample value at the slice layer in the process of determining adjacent sample values for the intra prediction mode for the decoding block.

In step 702, the parsing unit 301 parses the bitstream to obtain the intra prediction mode of the decoding block.

In case 1, the decoder uses simply intra prediction method 1 in FIG. 8 for the intra prediction unit 304.

The parsing unit 301 derives one or more intra prediction modes that are most likely to be used by the decoding block according to an intra prediction mode of a decoded block adjacent to the decoding block.

The parsing unit 301 parses a flag bit, where the value of the flag bit indicates "whether the intra prediction mode used by the decoding block is a mode among the intra prediction modes that are most likely to be used". If "yes" and only one intra prediction mode is included in the intra prediction modes that are most likely to be used, the parsing unit 301 configures the one intra prediction mode to be the intra prediction mode of the decoding block; if multiple intra prediction modes are included in the intra prediction modes that are most likely to be used, the parsing unit 301 parses an index and configures the intra prediction mode corresponding to the index among the intra prediction modes that are most likely to be used to be the intra prediction mode of the decoding block. Otherwise, if the value of the flag bit indicates "No", the parsing unit 301 parses an index and configures the intra prediction mode corresponding to the index to be the intra prediction mode used by the decoding block, where the intra prediction mode corresponding to the index is among intra prediction modes other than the intra prediction modes that are most likely to be used.

In case 2, the decoder uses intra prediction method 1 in FIG. 8 and intra prediction method 2 for the intra prediction unit 304.

The parsing unit 301 parses identification information for indicating whether the intra prediction mode of the decoding block belongs to intra prediction method 1 or intra prediction method 2. An optional method is that the parsing unit 301 parses a flag bit indicating the above information. An optional method is that the intra prediction mode of the decoding block is configured to be intra prediction method 2 when the parsing unit 301 parses an intra prediction flag of the decoding block as "No" and an index of a reference image of the decoding block indicates that "the reference image used by the decoding block is the image where the decoding block is located". Optionally, the parsing unit 301 may further parse a field related to intra prediction method 2 in the bitstream to determine the intra prediction mode used by the decoding block. Intra prediction method 2 may include intra prediction modes such as a block matching mode and a string matching mode. The parsing unit 301 continues to parse the bitstream to obtain related parameters for determining a matching block and a matching string, where the parameters are used for determining the positions of the matching block and the matching string in the image where the decoding block is located. For example, the parsing unit 301 parses the bitstream to obtain an offset between the positions of the decoding block and "Ref" in FIG. 9 in the same image coordinate system.

In step 703, the process in which the parsing unit 301 parses the intra prediction mode and the filtering parameters of the decoding block ends.

The decoder described above configures the first reference sample value to be the data stream 62 inputted to the adjacent sample value processing unit 602 in the intra prediction unit 304. The decoder described above configures the intra prediction mode to be the data stream 64 used in the intra prediction unit 304.

Embodiment Eleven

Figure 13:
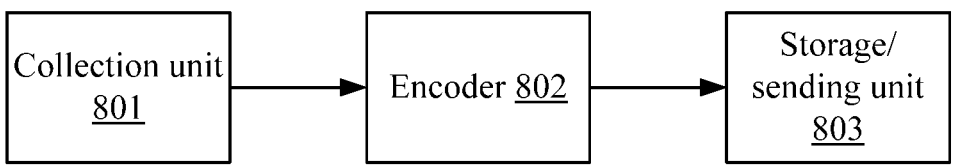
FIG. 13 is a structural diagram of an electronic device including an encoder according to an embodiment of the present disclosure.

Referring to FIG. 13, an embodiment of the present disclosure provides an encoding device including an encoder. The encoding device includes a collection unit 801, the encoder 802, and a sending unit 803.

The collection unit 801 is configured to collect a video or an image.

In practice, the collection unit 801 may include at least one camera for collecting a natural video or a natural image. Optionally, the collection unit 801 may also be configured with a camera for collecting a depth video or a depth image. Optionally, the collection unit may also be configured with an infrared camera. Optionally, the collection unit may also be configured with a remote sensing camera. The collection unit 801 may include an apparatus or a device that generates a video or an image through radiation transmission or scanning.

Optionally, pre-processing may be performed on an input video or image in the collection unit 801, such as auto focus, auto white balance, auto exposure, backlight compensation, noise reduction, sharpening, splicing, increasing or decreasing image resolution, increasing or decreasing a video frame rate, and a virtual view synthesis.

The collection unit 801 may also receive a video or image outputted by other devices or units. For example, the collection unit 801 may be a unit constituting a transcoder, and the transcoder inputs partially decoded images to the collection unit 801. For example, the collection unit 801 receives videos or images transmitted from other devices through a data connection.

It is to be noted that the collection unit 801 may also collect other media information such as audio in addition to videos or images. The collection unit 801 may also receive artificially generated information such as texts, subtitles, and computer-generated pictures or videos.

The encoder 802 is configured to receive the video or the image outputted by the collection unit 801, encode the video or the image, and output a video or image bitstream.

The storage/sending unit 803 is configured to receive the video or image bitstream outputted by the encoder 802 and perform system layer processing on the video or image bitstream.

Exemplarily, the storage/sending unit 803 performs the system layer processing on the video or image bitstream, which includes packaging according to standards such as a transmission protocol and a media file format. The storage/sending unit 803 stores a transmission stream or a media file obtained through the system layer processing into a memory in an electronic device or sends the transmission stream or the media file through a wired or wireless network.

It is to be noted that the input of the storage/sending unit 803 may include audio bitstreams, texts, subtitles, pictures, and the like in addition to the video or image bitstream outputted by the encoder 802. The storage/sending unit 803 packages these inputs and the bitstream outputted by the encoder 802 into the transmission stream or the media file according to the standards such as the transmission protocol and the media file format.

The electronic device in this embodiment may be a device that can generate or process the video or image bitstream in a video communication application, such as a mobile phone, a computer, a media server, a portable mobile terminal, a digital video camcorder, a digital camera, a television broadcasting system device, a content delivery network device, a surveillance camera, and a conference television system device.

Embodiment Twelve

Figure 14:
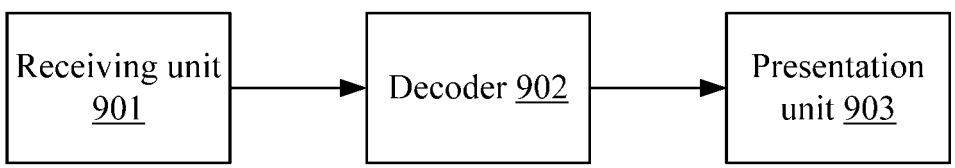
FIG. 14 is a structural diagram of an electronic device including a decoder according to an embodiment of the present disclosure.

Referring to FIG. 14, an embodiment of the present disclosure provides a structural diagram including a decoder.

A decoding device includes a receiving unit 901, the decoder 902, and a presentation unit 903.

The receiving unit 901 is configured to receive a video or image bitstream.

Exemplarily, the receiving unit 901 receives the video or image bitstream through a wired or wireless network, reads a memory in an electronic device to obtain the video or image bitstream, or receives the video or image bitstream transmitted from other devices through a data connection.

The input of the receiving unit 901 may also be a transmission stream or a media file that includes the video or image bitstream. The receiving unit 901 extracts the video or image bitstream from the received transmission stream or media file according to standards such as a transmission protocol and a media file format.

It is to be noted that the output of the receiving unit 901 may also include audio bitstreams, texts, subtitles, pictures, and the like in addition to the video or image bitstream. The receiving unit 901 transmits these outputs to the corresponding processing units in the electronic device. For example, the receiving unit 901 outputs the audio bitstreams to an audio decoder included in the electronic device.

The decoder 902 is configured to decode the received video or image bitstream outputted by the receiving unit 901 and output the decoded and restored video or image.

The presentation unit 903 is configured to receive and present the decoded and restored video or image outputted by the decoder 902.

It is to be noted that the presentation unit 903 may be a component of the electronic device, such as a display screen; and the presentation unit 903 may also be an independent device connected to the electronic device through a data connection, such as a projector and a display. Optionally, the presentation unit 903 may perform post-processing on the decoded and restored video or image, such as auto focus, auto white balance, auto exposure adjustment, backlight compensation, noise reduction, sharpening, splicing, increasing or decreasing image resolution, increasing or decreasing a video frame rate, and a virtual view synthesis.

It is to be noted that in addition to the decoded and restored video or image, the input of the presentation unit 903 may also include media data outputted from other units in the electronic device, such as audio, texts, subtitles, and pictures. The input of the presentation unit 903 also includes artificially generated data such as marking data such as a line drawn by a local lecturer on key content in a distance education application. The presentation unit 903 superimposes the inputted media data and displays the superimposed data to a viewer.

The electronic device in this embodiment may be a device that can decode or process the video or image bitstream in a video communication application, such as a mobile phone, a computer, a set-top box, a television, a player, a media server, a portable mobile terminal, a digital video camcorder, a digital camera, a television broadcasting system device, a content delivery network device, and a conference television system device.

Embodiment Thirteen

Figure 15:
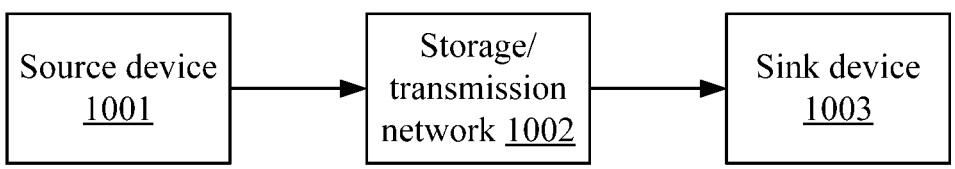
FIG. 15 is a schematic diagram illustrating system architecture of an electronic system according to an embodiment of the present disclosure.

Referring to FIG. 15, an embodiment of the present disclosure provides an electronic system including an encoding device and a decoding device.

A source device 1001 includes the encoding device shown in FIG. 13.

A storage/transmission network 1002 may include a memory in a device or the electronic system or an external memory that performs data read and write operations through a data connection; the storage/transmission network 1002 may also include a data transmission network composed of a wired network and a wireless network. The storage/transmission network 1002 provides a memory or a data transmission network for a storage/sending unit 803 in the source device 1001.

A sink device 1003 includes the decoding device shown in FIG. 14. A receiving unit 901 in the sink device 1003 receives a video or image bitstream, a transmission stream including the video or image bitstream, or a media file including the video or image bitstream provided by the storage/transmission network 1002.

Embodiment Fourteen

An embodiment of the present disclosure provides an encoder including a first processor, a first storage medium, and a first communication bus, where the first processor is connected to the first storage medium through the first communication bus.

The first processor invokes an image encoding-related program stored in the first storage medium and performs steps described below.

A first reference sample value of an encoding block is determined according to a pixel sample value in the encoding block.

An intra prediction mode of the encoding block is determined according to the first reference sample value, and an intra prediction value of the encoding block is calculated.

A prediction difference parameter is obtained according to original values of the encoding block and the intra prediction value.

The first reference sample value, the intra prediction mode, and the prediction difference parameter are encoded, and encoded bits are written into a bitstream.

Embodiment Fifteen

An embodiment of the present disclosure provides a decoder including a second processor, a second storage medium, and a second communication bus, where the second processor is connected to the second storage medium through the second communication bus.

The second processor invokes an image decoding-related program stored in the second storage medium and performs steps described below.

A bitstream is parsed to obtain a first reference sample value, an intra prediction mode, and a prediction difference parameter of a decoding block.

Intra prediction reference sample value of the decoding block is determined according to the first reference sample value.

An intra prediction value of the decoding block is constructed according to the intra prediction reference sample value and the intra prediction mode.

A prediction difference of the decoding block is calculated by using the prediction difference parameter.

A sum of the intra prediction value and the prediction difference is calculated to obtain a restored value of the decoding block.

In another aspect, an embodiment of the present disclosure provides a computer-readable storage medium applied to an encoder. The computer-readable storage medium stores one or more image encoding-related programs, where the one or more image encoding-related programs are executable by one or more first processors to implement any one of the image encoding methods described above.

In another aspect, an embodiment of the present disclosure provides a computer-readable storage medium applied to a decoder. The computer-readable storage medium stores one or more image decoding-related programs, where the one or more image decoding-related programs are executable by one or more second processors to implement any one of the image decoding methods described above.

An electronic system in this embodiment may be a system or a device that can generate, store/transmit, and decode a video or image bitstream in a video communication application, such as a mobile phone, a computer, an IPTV system, an OTT system, an Internet multimedia system, a digital television broadcasting system, a surveillance system, a portable mobile terminal, a digital video camcorder, a digital camera, and a conference television system device.

The present disclosure may have other various embodiments. Various corresponding changes and variations may be made by those skilled in the art according to the present disclosure without departing from the spirit and essence of the present disclosure. However, these corresponding changes and variations all fall within the scope of the appended claims of the present disclosure.

It should be understood by those skilled in the art that the embodiments of the present disclosure may be provided as methods or computer program products. Therefore, the present disclosure may adopt a hardware embodiment, a software embodiment, or a combination of hardware and software embodiments. In addition, the present disclosure may adopt the form of a computer program product implemented on one or more computer-usable storage media (including, but not limited to, a disk memory and an optical memory, etc.) that include computer-usable program codes.

The present disclosure is described with reference to flowcharts and/or block diagrams of methods, devices (systems), and computer program products according to the embodiments of the present disclosure. It is to be understood that each flow and/or block in the flowcharts and/or block diagrams and a combination of flows and/or blocks in the flowcharts and/or block diagrams may be implemented using computer program instructions. These computer program instructions may be provided to a processor of a general-purpose computer, special-purpose computer, embedded processor or another programmable data processing device to produce a machine so as to enable the instructions executed by the processor of the computer or another programmable data processing device to generate an apparatus for implementing the functions specified in one or more flows in the flowcharts and/or one or more blocks in the block diagrams.

These computer program instructions may also be stored in a computer-readable memory that can direct a computer or another programmable data processing device to operate in a particular manner, so that the instructions stored in the computer-readable memory produce an article of manufacture including an instruction apparatus. The instruction apparatus implements the functions specified in one or more flows in the flowcharts and/or one or more blocks in the block diagrams.

What is claimed is:

1. An image encoding method, comprising:
   determining a first reference sample value of an encoding block according to a pixel sample value in the encoding block;
   determining an intra prediction mode of the encoding block according to the first reference sample value and calculating an intra prediction value of the encoding block;
   obtaining a prediction difference parameter according to original values of the encoding block and the intra prediction value; and
   encoding the first reference sample value, the intra prediction mode and the prediction difference parameter, and writing encoded bits into a bitstream;
   wherein the first reference sample value comprises at least two sample values and a usage manner indication parameter, and wherein a sample value usage manner parameter is used for indicating a usage manner of the at least two sample values comprised in the first reference sample value in a process of setting the reference sample values of the encoding block.

2. An encoder, comprising: a first processor, a first storage medium, and a first communication bus, wherein the first processor is connected to the first storage medium through the first communication bus; and
   the first processor invokes an image encoding-related program stored in the first storage medium and performs the method of claim 1.

3. An image decoding method, comprising:
   parsing a bitstream to obtain a first reference sample value, an intra prediction mode, and a prediction difference parameter of a decoding block;
   determining an intra prediction reference sample value of the decoding block according to the first reference sample value;
   constructing an intra prediction value of the decoding block according to the intra prediction reference sample value and the intra prediction mode;
   calculating a prediction difference of the decoding block by using the prediction difference parameter; and
   calculating a sum of the intra prediction value and the prediction difference to obtain a restored value of the decoding block;
   wherein parsing the bitstream to obtain the first reference sample value of the decoding block comprises:
   parsing one or more data units in the bitstream to obtain a sample value usage manner parameter, wherein the sample value usage manner parameter is used for indicating a usage manner of a sample value comprised in the first reference sample value in a process of setting reference sample values of the decoding block.

4. The method of claim 3, wherein determining the intra prediction reference sample value of the decoding block according to the first reference sample value comprises:
   determining whether reference sample values of the decoding block are existent, wherein each of the reference sample values is a restored pixel sample value of a respective pixel point adjacent to the decoding block, and in a case where part or all of the reference sample values of the decoding block are non-existent, determining a non-existent reference sample value for the decoding block according to the first reference sample value to obtain the intra prediction reference sample value;
   or
   determining whether all of reference sample values in a matching block of the decoding block are existent, and in a case where part or all of the reference sample values in the matching block of the decoding block are non-existent, determining that part or all of reference sample values of the decoding block are non-existent, and determining a non-existent reference sample value of the decoding block according to the first reference sample value to obtain the intra prediction reference sample value.

5. The method of claim 4, wherein the matching block of the decoding block is located at a region which is in an image where the decoding block is located and has a same size as the decoding block.

6. The method of claim 4, wherein a method for determining whether a reference sample value of the reference sample values is existent comprises at least one of:
in a case where a position of a reference pixel point corresponding to the reference sample value is in an un-decoded image region in an image where the decoding block is located, determining that the reference sample value is non-existent;
in a case where a position of a reference pixel point corresponding to the reference sample value is outside a boundary of an image where the decoding block is located, determining that the reference sample value is non-existent;
in an image where the decoding block is located, in a case where a position of a reference pixel point corresponding to the reference sample value is outside a slice where the decoding block is located, determining that the reference sample value is non-existent;
in an image where the decoding block is located, in a case where a position of a reference pixel point corresponding to the reference sample value is outside a tile where the decoding block is located, determining that the reference sample value is non-existent; or
in response to an intra prediction limited mode, in an image where the decoding block is located, in a case where a position of a reference pixel point corresponding to the reference sample value is in a decoding block of a non-intra prediction mode, determining that the reference sample value is non-existent.

7. The method of claim 4, wherein determining the non-existent reference sample value of the decoding block according to the first reference sample value comprises:
setting the non-existent reference sample value of the decoding block by using the first reference sample value.

8. The method of claim 4, wherein the first reference sample value comprises a sample value control parameter, and determining the non-existent reference sample value of the decoding block according to the first reference sample value comprises:
in a case where the sample value control parameter indicates that the non-existent reference sample value is to be constructed by using the first reference sample value, setting the non-existent reference sample value of the decoding block by using the first reference sample value.

9. The method of claim 4, wherein the first reference sample value comprises the sample value usage manner parameter, and determining the non-existent reference sample value of the decoding block according to the first reference sample value comprises:
in a case where the first reference sample value comprises at least two sample values, setting the non-existent reference sample value of the decoding block by using the at least two sample values comprised in the first reference sample value according to the sample value usage manner parameter.

10. The method of claim 9, wherein the first reference sample value comprises two sample values, and setting the non-existent reference sample value of the decoding block by using the at least two sample values comprised in the first reference sample value according to the sample value usage manner parameter comprises:
setting, according to a preset rule, a non-existent reference sample value at a position of a left adjacent reference pixel point of the decoding block and a non-existent reference sample value at a position of an above adjacent reference pixel point of the decoding block respectively by using the two sample values in the first reference sample value.

11. The method of claim 3, wherein parsing the bitstream to obtain the first reference sample value of the decoding block comprises:
parsing one or more data units in the bitstream to obtain the first reference sample value, wherein each of the one or more data units comprises at least one of: one or more parameter sets, a slice header, or a block layer data unit.

12. The method of claim 3, wherein the first reference sample value comprises a sample value control parameter, wherein the sample value control parameter comprises at least one of: a sequence layer sample value control parameter, an image layer sample value control parameter, a slice layer sample value control parameter, or a block layer sample value control parameter.

13. The method of claim 3, wherein constructing the intra prediction value of the decoding block according to the intra prediction reference sample value and the intra prediction mode further comprises:
filtering the intra prediction reference sample value to obtain the filtered reference sample value; and
calculating, according to the intra prediction mode, the intra prediction value of the decoding block by using the filtered reference sample value.

14. The method of claim 13, wherein filtering the intra prediction reference sample value to obtain the filtered reference sample value comprises:
parsing the bitstream to obtain a filter control parameter, wherein the filter control parameter is used for indicating whether to filter the intra prediction reference sample value; and
in a case where the filter control parameter indicates that the intra prediction reference sample value is to be filtered, filtering the intra prediction reference sample value to obtain the filtered reference sample value.

15. The method of claim 13, wherein filtering the intra prediction reference sample value to obtain the filtered reference sample value comprises:
in a case where a size of the decoding block is equal to a preset value, parsing the bitstream to obtain a filter control parameter; and
in a case where the filter control parameter indicates that the intra prediction reference sample value is to be filtered, filtering the intra prediction reference sample value to obtain the filtered reference sample value.

16. The method of claim 13, wherein filtering the intra prediction reference sample value to obtain the filtered reference sample value comprises:
in a case where a size of the decoding block is equal to a preset value, filtering the intra prediction reference sample value to obtain the filtered reference sample value.

17. The method of claim 13, wherein filtering the intra prediction reference sample value to obtain the filtered reference sample value comprises:

in a case where the intra prediction mode of the decoding block is a preset mode, parsing the bitstream to obtain a filter control parameter, and in a case where the filter control parameter indicates that the intra prediction reference sample value is to be filtered, filtering the intra prediction reference sample value to obtain the filtered reference sample value;

in a case where the intra prediction mode of the decoding block is a preset mode, filtering the intra prediction reference sample value to obtain the filtered reference sample value;

in a case where a size of the decoding block is equal to a preset value and the intra prediction mode of the decoding block is a preset mode, parsing the bitstream to obtain a filter control parameter, and in a case where the filter control parameter indicates that the intra prediction reference sample value is to be filtered, filtering the intra prediction reference sample value to obtain the filtered reference sample value; or in a case where a size of the decoding block is equal to a preset value and the intra prediction mode of the decoding block is a preset mode, filtering the intra prediction reference sample value to obtain the filtered reference sample value.

18. The method of claim 3, wherein calculating the prediction difference of the decoding block by using the prediction difference parameter comprises:

scaling and transforming the prediction difference parameter to obtain the prediction difference of the decoding block; or after setting the sum of the intra prediction value and the prediction difference to the restored value of the decoding block, the method further comprises:

performing loop filtering on the restored value of the decoding block to obtain a decoded value.

19. A decoder, comprising: a second processor, a second storage medium, and a second communication bus, wherein the second processor is connected to the second storage medium through the second communication bus; and the second processor invokes an image decoding-related program stored in the second storage medium and performs following steps:

parsing a bitstream to obtain a first reference sample value, an intra prediction mode, and a prediction difference parameter of a decoding block;

determining an intra prediction reference sample value of the decoding block according to the first reference sample value;

constructing an intra prediction value of the decoding block according to the intra prediction reference sample value and the intra prediction mode;

calculating a prediction difference of the decoding block by using the prediction difference parameter; and calculating a sum of the intra prediction value and the prediction difference to obtain a restored value of the decoding block;

wherein parsing the bitstream to obtain the first reference sample value of the decoding block comprises:

parsing one or more data units in the bitstream to obtain a sample value usage manner parameter, wherein the sample value usage manner parameter is used for indicating a usage manner of a sample value comprised in the first reference sample value in a process of setting reference sample values of the decoding block.

* * * * *